(12) United States Patent
Lee et al.

(10) Patent No.: US 10,915,138 B2
(45) Date of Patent: Feb. 9, 2021

(54) DISPLAY APPARATUS

(71) Applicant: LG Display Co., Ltd., Seoul (KR)

(72) Inventors: Sungtae Lee, Bucheon-si (KR); KwanHo Park, Bucheon-si (KR); YeongRak Choi, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/921,440

(22) Filed: Jul. 6, 2020

(65) Prior Publication Data
US 2020/0333831 A1    Oct. 22, 2020

Related U.S. Application Data

(63) Continuation of application No. 16/018,348, filed on Jun. 26, 2018, now Pat. No. 10,754,372.

(30) Foreign Application Priority Data

Jul. 12, 2017  (KR) .................. 10-2017-0088695

(51) Int. Cl.
| | |
|---|---|
| *G06F 3/02* | (2006.01) |
| *G06F 1/16* | (2006.01) |
| *H04R 1/02* | (2006.01) |
| *G02F 1/1362* | (2006.01) |
| *G02F 1/1333* | (2006.01) |

(52) U.S. Cl.
CPC ...... *G06F 1/1605* (2013.01); *G02F 1/136286* (2013.01); *H04R 1/025* (2013.01); *G02F 1/133308* (2013.01); *G02F 2001/133314* (2013.01); *G02F 2001/133394* (2013.01); *G09G 2310/0264* (2013.01); *H04R 2499/13* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 4,891,842 A | 1/1990 | Green | |
| 5,025,474 A | 6/1991 | Tanaka et al. | |
| 6,332,029 B1 * | 12/2001 | Azima ................. | B42D 15/022 381/152 |

(Continued)

FOREIGN PATENT DOCUMENTS

| | | |
|---|---|---|
| CN | 1720760 A | 1/2006 |
| CN | 101420643 A | 4/2009 |

(Continued)

OTHER PUBLICATIONS

First Notification of Office Action dated Mar. 25, 2020, issued in corresponding Chinese Patent Application No. 201810736832.8.

(Continued)

*Primary Examiner* — Xanthia C Cunningham
(74) *Attorney, Agent, or Firm* — Morgan, Lewis & Bockius LLP

(57) ABSTRACT

A display apparatus includes: a display panel configured to display an image, at least one supporting member on a rear surface of the display panel, the at least one supporting member defining a groove, at least one sound generation device adjacent to the display panel, and a wiring, accommodated into the groove, configured to transfer a signal to the at least one sound generation device.

32 Claims, 26 Drawing Sheets

(56) References Cited

U.S. PATENT DOCUMENTS

| | | | | |
|---|---|---|---|---|
| 6,836,552 B1* | 12/2004 | Bachmann | | H04R 7/06 |
| | | | | 381/152 |
| 6,934,399 B2* | 8/2005 | Kam | | H04R 7/045 |
| | | | | 381/152 |
| 7,167,570 B2* | 1/2007 | Kobayashi | | H04R 1/2834 |
| | | | | 381/152 |
| 7,382,890 B2* | 6/2008 | Saiki | | H04R 1/2834 |
| | | | | 381/152 |
| 7,412,065 B2* | 8/2008 | Nguyen | | H04R 9/06 |
| | | | | 381/152 |
| 7,596,235 B2* | 9/2009 | Michiels | | H04R 17/00 |
| | | | | 381/152 |
| 7,636,447 B2* | 12/2009 | Saint-Vincent | | H04R 1/02 |
| | | | | 181/150 |
| 7,724,915 B2* | 5/2010 | Matsumura | | H04R 9/025 |
| | | | | 381/421 |
| 8,090,138 B2* | 1/2012 | Toyama | | B60R 11/0223 |
| | | | | 381/396 |
| 8,543,168 B2* | 9/2013 | Zurek | | H04R 7/18 |
| | | | | 455/566 |
| 8,644,527 B2* | 2/2014 | Fujise | | H04R 3/04 |
| | | | | 381/173 |
| 8,818,006 B2* | 8/2014 | Yamauchi | | H04N 5/642 |
| | | | | 381/152 |
| 8,942,410 B2* | 1/2015 | Wilk | | H04R 9/025 |
| | | | | 381/412 |
| 8,953,823 B2* | 2/2015 | Fujise | | H04R 17/00 |
| | | | | 381/190 |
| 9,014,413 B2* | 4/2015 | Cheung | | H04R 1/00 |
| | | | | 381/401 |
| 9,154,862 B2* | 10/2015 | Cheung | | H04R 7/10 |
| 9,386,378 B2* | 7/2016 | Fukuoka | | B06B 1/0603 |
| 9,525,943 B2* | 12/2016 | Donarski | | H04R 7/04 |
| 9,621,994 B1* | 4/2017 | Bongiovi | | H04R 9/06 |
| 9,877,112 B2* | 1/2018 | Srivastava | | H04R 5/02 |
| 9,906,867 B2* | 2/2018 | Bongiovi | | H04R 9/025 |
| 9,949,036 B2* | 4/2018 | Ozasa | | H04R 17/005 |
| 10,003,872 B2* | 6/2018 | Pellikka | | H04R 1/026 |
| 10,034,093 B2* | 7/2018 | Foglia | | B32B 3/28 |
| 2005/0271230 A1 | 12/2005 | Sasaki | | |
| 2008/0060856 A1* | 3/2008 | Shahoian | | G06F 3/016 |
| | | | | 178/18.03 |
| 2009/0101384 A1 | 4/2009 | Kawasaki et al. | | |
| 2011/0128245 A1* | 6/2011 | Andoh | | H01L 41/193 |
| | | | | 345/173 |
| 2012/0243719 A1* | 9/2012 | Franklin | | H04R 1/02 |
| | | | | 381/333 |
| 2014/0133689 A1 | 5/2014 | Yu | | |
| 2014/0334078 A1* | 11/2014 | Lee | | H04M 1/035 |
| | | | | 361/679.01 |
| 2015/0054779 A1* | 2/2015 | Horii | | H04M 19/047 |
| | | | | 345/174 |
| 2015/0154885 A1* | 6/2015 | Livermore-Clifford | | |
| | | | | G09B 21/003 |
| | | | | 434/114 |
| 2015/0195630 A1* | 7/2015 | Yliaho | | H04R 7/04 |
| | | | | 381/162 |
| 2015/0373441 A1* | 12/2015 | Behles | | H04R 1/028 |
| | | | | 381/333 |
| 2016/0004311 A1* | 1/2016 | Yliaho | | H04R 3/14 |
| | | | | 381/99 |
| 2016/0192081 A1* | 6/2016 | Horii | | H04R 17/00 |
| | | | | 379/420.02 |
| 2017/0105294 A1* | 4/2017 | Shimoda | | H04B 1/3888 |
| 2017/0257707 A1* | 9/2017 | Shimoda | | H04R 1/028 |

FOREIGN PATENT DOCUMENTS

| | | |
|---|---|---|
| CN | 201955818 U | 8/2011 |
| CN | 202663535 U | 1/2013 |
| CN | 203086646 U | 7/2013 |
| CN | 203206465 U | 9/2013 |
| CN | 203522913 U | 4/2014 |
| CN | 203552136 U | 4/2014 |
| CN | 103809669 A | 5/2014 |
| CN | 204129607 U | 1/2015 |
| CN | 205318299 U | 6/2016 |
| WO | 2015098090 A1 | 7/2015 |

OTHER PUBLICATIONS

《东莞科技馆之旅》, 李国任, p. 165, 广东人民出版社. ("Dongguan Science and Technology Museum Tour", Li Guoren, p. 165, Guangdong People's Publishing House.) Apr. 30, 2009.

Second Notification of Office Action dated Sep. 21, 2020, issued in corresponding Chinese Patent application No. 201810736832.8.

* cited by examiner

DISPLAY APPARATUS

CROSS-REFERENCE TO RELATED APPLICATION(S)

This application is a Continuation Application of U.S. patent application Ser. No. 16/018,348, filed on Jun. 26, 2018, which claims the benefit of and priority to Korean Patent Application No. 10-2017-0088695, filed on Jul. 12, 2017, the entirety of both of which are hereby incorporated by reference.

BACKGROUND

1. Technical Field

The present disclosure relates to a display apparatus, and more particularly, to a display apparatus that vibrates a display panel to generate sound.

2. Discussion of the Related Art

With the advancement of an information-oriented society, various requirements for the display field of expressing information in accordance with an electrical information signal are increasing. Thus, research is being conducted on various display apparatuses that are thin, light, and have low power consumption. For example, display apparatuses include a liquid crystal display (LCD) apparatus, a field emission display (FED) apparatus, an organic light-emitting display apparatus, etc.

Among the above display apparatus, the LCD apparatus may include an array substrate including a thin film transistor (TFT), an upper substrate including a color filter and/or a black matrix, and a liquid crystal layer between the array substrate and the upper substrate. An alignment state of the liquid crystal layer is controlled based on an electric field applied to two electrodes in a pixel region, whereby light transmittance is adjusted based on the alignment state of the liquid crystal layer, thereby displaying an image.

The organic light-emitting display apparatus, which a self-light-emitting display apparatus, has advantages, such as fast response speed, high light-emitting efficiency, high luminance, and a wide viewing angle in comparison with other display apparatuses. Thus, organic light-emitting display apparatuses are attracting much attention.

A display apparatus may display an image, and an additional speaker for supplying sound generally has to be provided. If the speaker is provided in the display apparatus, the sound generated in the speaker advances toward a lower or rear portion of the display panel, instead of toward a front portion of the display panel. Thus, the sound does not advance toward the front portion of the display panel, i.e., toward a user who watches the image displayed on the display panel, which may be disruptive to a user's immersion experience.

In addition, when the sound generated in the speaker advances toward the lower or rear portion of the display panel, sound quality is deteriorated due to interference with sound reflected on the wall or floor. Furthermore, when the speaker is included in a set apparatus, such as a television (TV), the speaker occupies a space, which may impose a restriction on design and a spatial disposition of the set apparatus is limited.

SUMMARY

Accordingly, the present disclosure is directed to a display apparatus that substantially obviates one or more of the issues due to limitations and disadvantages of the related art.

An aspect of the present disclosure is to provide a display apparatus including a sound generation device capable of outputting sound to a front direction of a display panel.

Another aspect of the present disclosure is to provide a display apparatus having an enhanced aesthetic because a wiring for supplying a signal to a sound generation device is disposed to not be visible at a supporting member.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel configured to display an image, at least one supporting member on a rear surface of the display panel, the at least one supporting member defining a groove, at least one sound generation device adjacent to the display panel, and a wiring, accommodated into the groove, configured to transfer a signal to the at least one sound generation device.

In another aspect, there is provided a display apparatus, including: a display panel configured to display an image, the display panel including: a first region, a second region, and a third region, at least one supporting member on a rear surface of the display panel, at least one sound generation device configured to vibrate the display panel to generate sound, the at least one sound generation device being in at least one of the first region, the second region, and the third region, and a wiring between the display panel and the at least one supporting member, the wiring being configured to transfer a signal to the at least one sound generation device.

In another aspect, there is provided a display apparatus, including: a display panel configured to display an image, a first supporting member and a second supporting member on a rear surface of the display panel, at least one sound generation device configured to vibrate the display panel to generate sound, the at least one sound generation device being adjacent to the display panel, a rear cover on a rear surface of the first supporting member, and a wiring configured to transfer a signal to the at least one sound generation device, wherein the wiring extends to a rear surface of the first supporting member and is covered by the rear cover.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1A:
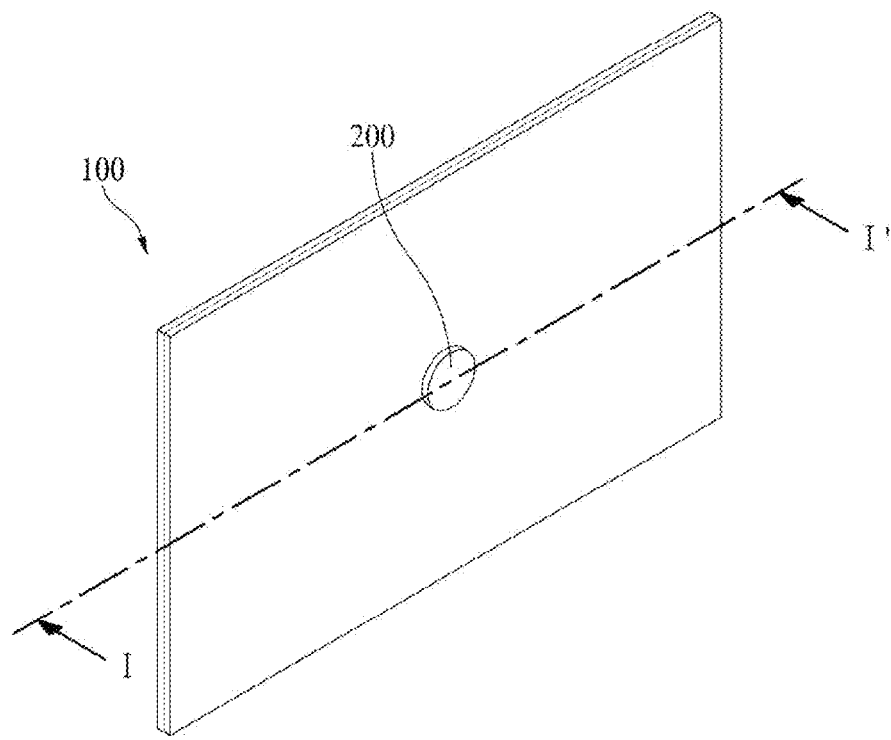
FIG. 1A illustrates a display apparatus including a sound generation device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus is used to encompass a display apparatus such as an organic light emitting display module (OLED module) or a liquid crystal module (LCM), that includes a display panel and a driving unit for driving the display panel. The display apparatus is used to further encompass a set device (or a set apparatus) or a set electronic apparatus, as a finished product, such as a notebook computer or a laptop computer, a television set, a computer monitor, an equipment apparatus (e.g., display equipment in an automotive apparatus or another type of vehicle apparatus) or a mobile electronic apparatus that is a complete product or a final product (for example, a smartphone or an electronic pad, etc.) that includes the LCM or the OLED module. Therefore, in the present disclosure, the display apparatus is used display apparatus itself, such as the LCM or the OLED module, and also a set apparatus which is a final consumer apparatus or an application product including the LCM or the OLED module.

In some example embodiments, the LCM or the OLED module including a display panel and a driving unit thereof may be referred to as a display apparatus, and the electronic apparatus as a final product including the LCM or the OLED module may be referred to as a set apparatus. For example, the display apparatus may include a display panel, such as an LCD or an OLED, and a source printed circuit board (PCB) as a controller for driving the same, the set apparatus may further include a set PCB that is a set controller set to be electrically connected to the source PCB and to control the overall operations of the set apparatus.

A display panel applied to an embodiment may use all types of display panels, such as a liquid crystal display panel, an organic light emitting diode (OLED) display panel, and an electroluminescent display panel, but is not limited to these specific types. For example, the display panel of the present disclosure may be any panel capable of being vibrated by a sound generation device according to embodiments of the present disclosure to output a sound. A shape or a size of a display panel applied to a display apparatus according to embodiments of the present disclosure is not limited.

For example, if a display panel is a liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

In addition, if a display panel is an organic light-emitting display panel, the display panel may include a plurality of gate lines, a plurality of data lines, and a plurality of pixels respectively provided in a plurality of pixel areas defined by intersections of the gate lines and the data lines. The display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact, and may prevent water or oxygen from permeating into the organic light emitting device layer. A layer provided on the array substrate may include an inorganic light-emitting layer (for example, a nano-sized material layer or the like). The display panel may further include a backing such as a metal plate attached on the rear surface of the display panel, but the backing is not limited to the metal plate, and another structure may be included.

In the present disclosure, the display panel including a sound generation device may be implemented at a user interface module in a vehicle, such as the central control panel area in an automobile. For example, such a display panel may be configured between two front seat occupants, such that sounds due to a vibration of the display panel propagate towards the interior of the vehicle. As such, the audio experience within a vehicle can be improved as compared to having speakers at the interior sides or edges of the vehicle.

The inventors have recognized the above-described problems and have conducted various experiments so that, when watching an image in front of a display panel, a traveling direction of sound becomes a direction toward a front portion of the display panel. Thus, sound quality is enhanced. Through the various experiments, the inventors have invented a display apparatus having a new structure, which facilitates output of sound so that a traveling direction of sound becomes a direction toward a front portion of a display panel, thereby enhancing sound quality.

Hereinafter, a display apparatus according to an embodiment of the present disclosure will be described in detail with reference to the accompanying drawings.

FIG. 1A illustrates a display apparatus including a sound generation device according to an example embodiment of the present disclosure.

With reference to FIG. 1A, a display apparatus 10 may include a display panel 100, which displays an image, and a sound generation device 200 that may vibrate the display panel 100 to generate sound. The sound generation device 200 may be referred to, for example, as an actuator, an exciter, or a transducer.

Figure 1B:
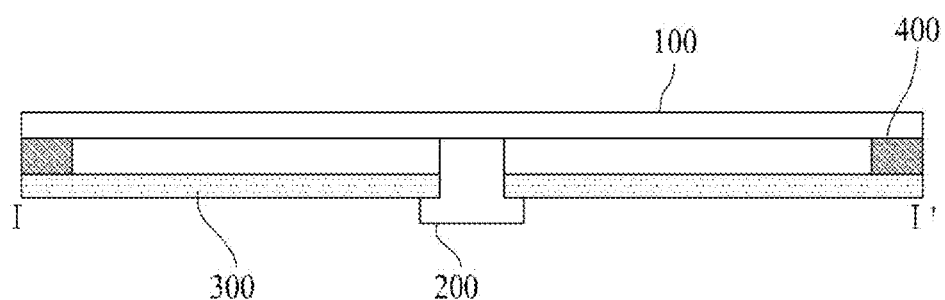
FIG. 1B is a cross-sectional view taken along line I-I' of FIG. 1A.

FIG. 1B is a cross-sectional view taken along line I-I' of FIG. 1A.

With reference to FIG. 1B, the display apparatus may include the sound generation device 200 and a supporting member 300. The supporting member 300 may support one or more of a rear surface and a side (lateral) surface of the display panel 100. Also, the sound generation device 200 may be fixed to the supporting member 300.

The supporting member 300 may be, for example, a cover bottom. Alternatively, the supporting member 300 may further include a middle cabinet, which may be connected to a cover bottom, may surround the side surface of the display panel 100, may accommodate one periphery of the display panel 100, and may support the display panel 100. For example, the middle cabinet may include a "┤"-shaped (or T-shape at a 90-degree angle) cross-sectional surface. The supporting member 300 may include the cover bottom, or may include the cover bottom and the middle cabinet, but embodiments are not limited thereto. For example, the supporting member 300 may include a structure that may cover the rear surface or the side surface of the display panel 100. Moreover, the supporting member 300 may be a plate-shaped member formed over a rear surface or entire surface of the display panel 100.

The supporting member 300 may be referred to as a cover bottom, a plate bottom, a back cover, a base frame, a metal frame, a metal chassis, a chassis base, or an m-chassis. Therefore, the supporting member 300 may be implemented as all types of frames or plate structures that may be a support for supporting the display panel 100 and may be on the rear surface of the display apparatus.

An adhesive member 400 may be disposed in a periphery of each of the display panel 100 and the supporting member 300, and may attach the display panel 100 on the supporting member 300. The adhesive member 400 may include a double-sided tape and/or the like, but embodiments are not limited thereto.

Figure 2A:
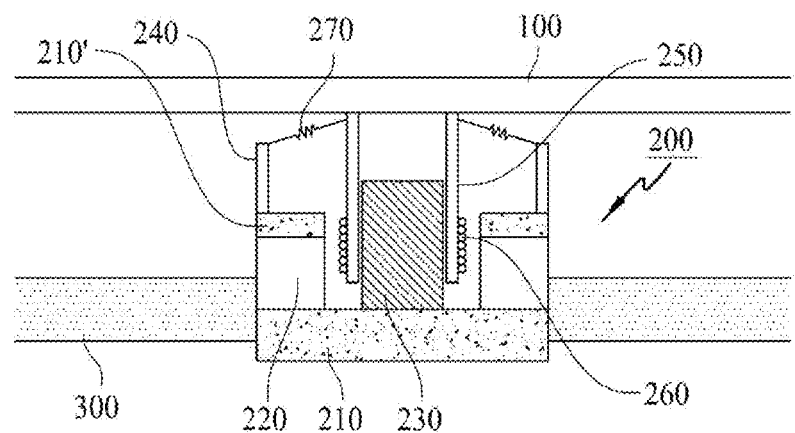
FIGS. 2A and 2B are cross-sectional views illustrating a sound generation device according to an example embodiment of the present disclosure.
Figure 2B:
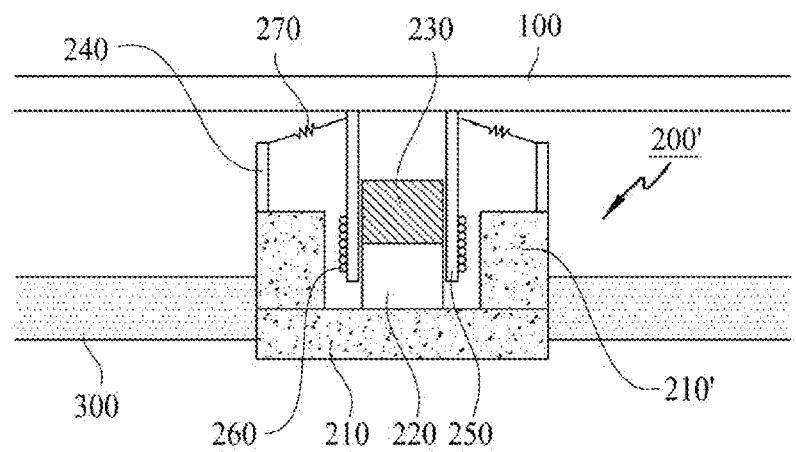

FIGS. 2A and 2B are cross-sectional views illustrating a sound generation device according to an example embodiment of the present disclosure.

The sound generation device may be classified into a first structure in which a magnet is disposed outside a coil, and a second structure in which a magnet is disposed inside a coil. The first structure may be referred to as a "dynamic" type or an "external magnetic" type. The second structure may be referred to as a "micro" type or an "internal magnetic" type. FIG. 2A illustrates the first structure, and FIG. 2B illustrates the second structure.

With reference to FIG. 2A, a sound generation device 200 may include a plurality of plates 210 and 210', a magnet 220 on the plate, a center pole 230 on the plate, a bobbin 250 disposed near the center pole 230, and a coil 260 wound an outer surface of the bobbin 250. For example, the magnet 220 may be provided on the first plate 210, and a second plate 210' may be provided on the magnet 220. The first plate 210 and the second plate 210' may support the magnet 220, and may fix the sound generation device 200 to a supporting member 300. Therefore, the first plate 210 may be fixed to a supporting hole provided in the supporting member 300, and the magnet 220 (between the first plate 210 and the second plate 210') may be fixed and supported.

At least one of the first plate 210 and the second plate 210' may be formed of a magnetic material such as iron (Fe), although embodiments are not limited thereto. A "plate" is not limited to the term, and may be expressed by using another term, such as a yoke.

The magnet 220 may be implemented, e.g., with a sintered magnet with a material, such as barium ferrite. A material of the magnet 220 may include one or more of: ferric oxide ($Fe_2O_3$), barium carbonate (or witherite) ($BaCO_3$), a neodymium (Nd) magnet, strontium ferrite ($Fe_{12}O_{19}Sr$), e.g., with an improved magnet component, an alloy cast magnet including aluminum (Al), nickel (Ni), and cobalt (Co), and the like. As another example, the neodymium magnet may be neodymium-iron-boron (Nd—Fe—B). However, embodiments are not limited these examples.

A frame 240 may be disposed outside the first plate 210 and on the second plate 210'. A center pole 230 may be disposed in a center region of the first plate 210. The center pole 230 and the first plate 210 may be provided as one body. The center pole 230 may be referred to as "pole pieces." Alternatively, pole pieces may be additionally disposed on the center pole 230.

Moreover, the bobbin 250 may be disposed to surround the center pole 230. The coil 260 may be wound around a lower portion of the bobbin 250, and a current or a voice signal for generating a sound may be applied to the coil 260.

The bobbin 250 may be a ring-shaped structure that may be formed of paper, an aluminum (Al) sheet, and/or the like. The coil 260 may be wound around a particular lower region of the bobbin 250. The generic term for the bobbin 250 and the coil 260 may be a voice coil.

Moreover, a damper 270 may be disposed between the frame 240 and a portion of an upper side of the bobbin 250. The damper may be expressed using another term, such as an edge.

FIG. 2B illustrates the second structure where a magnet is disposed inside a coil. With reference to FIG. 2B, a sound generation device 200' having the second structure may include a magnet 220 disposed on a first plate 210, a center pole 230 disposed on the magnet 220, a bobbin 250 disposed near the magnet 220 and the center pole 230, and a coil 260 wound around the bobbin 250.

The first plate 210 may be fixed to a supporting hole provided in a supporting member 300. The magnet 220 may be disposed on the first plate 210, and the center pole 230 may be disposed on the magnet 220. The center pole 230 may be referred to as "pole pieces." Alternatively, pole pieces may be further disposed on the center pole 230.

Moreover, the bobbin 250 may surround the magnet 220 and the center pole 230. The coil 260 may be wound around the bobbin 250. A second plate 210' may be disposed near the first plate 210, and a frame 240 may be disposed outside the second plate 210'. Also, a damper 270 may be disposed between the frame 240 and the bobbin 250. In the sound generation device having the second structure, leakage magnetic flux is relatively small, and a total size is relatively small, in comparison with the first structure where a magnet is disposed outside a coil.

The bobbin or the voice coil of the sound generation device according to an embodiment of the present disclosure may be configured in a circular shape or an oval shape. An oval shape may include an elliptical shape, an egg-shape, a rectangular shape with rounded corners, or other non-circular curved shape having a width different from its height. If the bobbin or the voice coil is configured in an elliptical shape or an oval shape, a sound having a high-pitched sound band may be improved in comparison with sound generated using a bobbin of a circular shape, and the occurrence of heat caused by a vibration of the bobbin or the voice coil may be reduced, thereby enhancing a heat dissipation characteristic.

The sound generation device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generation device that may vibrate a display panel to generate sound.

Figure 3A:
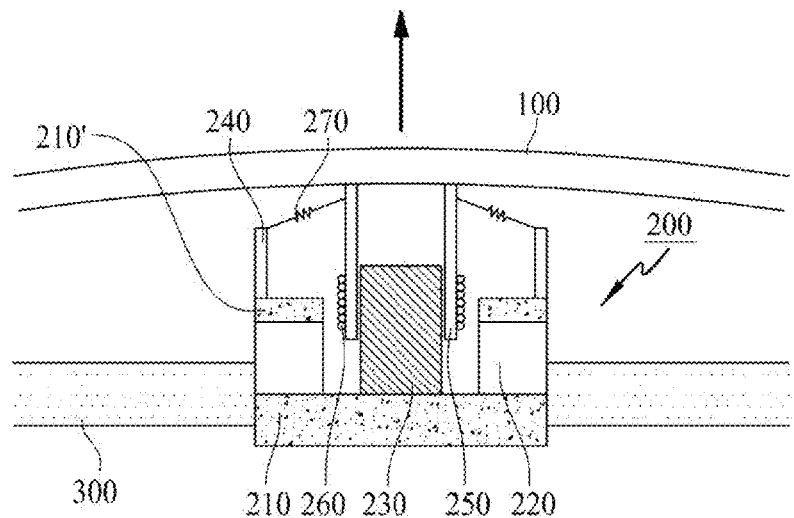
FIGS. 3A and 3B illustrate a sound generating operation method of a sound generation device with a first structure according to an example embodiment of the present disclosure.
Figure 3B:
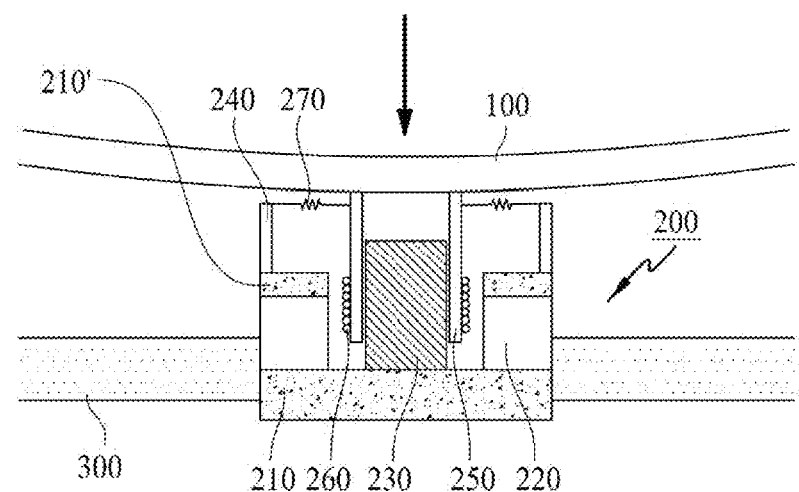

FIGS. 3A and 3B illustrate a sound generating operation method of a sound generation device with a first structure according to an example embodiment of the present disclosure.

FIG. 3A illustrates a state in which a current is applied. The center pole 230 connected to a bottom of the magnet 220 becomes a north (N) pole, and the second plate 210' connected to a top of the magnet 220 becomes a south (S) pole. Thus, an external magnetic field may be generated around the coil 260.

In this state, if the current for generating a sound is applied to the coil 260, an applied magnetic field is formed around the coil 260, whereby a force for upwardly moving the bobbin 250 may be generated by the applied magnetic field and the external magnetic field. For example, when the current is applied to the coil 260, the magnetic field may be generated around the coil 260, and the external magnetic field may be generated by the magnet 220, whereby the entire bobbin 250 may be guided and may move upward by the center pole 230 based on Fleming's Left-Hand Rule for Motors.

Accordingly, as one surface of the bobbin 250 may contact a rear surface of the display panel 100, the bobbin 250 may vibrate the display panel 100 in an upward direction (illustrated as an arrow) according to whether or not the current is applied to the coil 260, and a sound wave (or sound) is generated by the vibration of the display panel 100.

In this state, when the current stops or a reverse current is applied, as shown in FIG. 3B, a force for downwardly moving the bobbin 250 may be generated, similar to the principle described with reference to FIG. 3A, and the display panel 100 may vibrate in a downward direction (illustrated as an arrow).

The damper 270 may be between the frame 240 and some portion of an upper side of the bobbin 250. The damper 270 may have a wrinkled structure, e.g., having elasticity, and the damper 270 may control (or dampen) the up-and-down vibration of the bobbin 250 by contraction and relaxation movements in accordance with the up-and-down movement of the bobbin 250. That is, the damper 270 may be connected to the bobbin 250 and the frame 240, and the up-and-down vibration of the bobbin 250 may be controlled by a restoring force of the damper 270. For example, when the bobbin 250 vibrates by a certain height or more or vibrates by a certain height or less, the bobbin 250 may be restored to its original position by the restoring force of the damper 270.

Therefore, the display panel 100 may vertically vibrate based on an application direction and level of a current applied to the coil 260. A sound wave may be generated by the vibration.

Figure 4A:
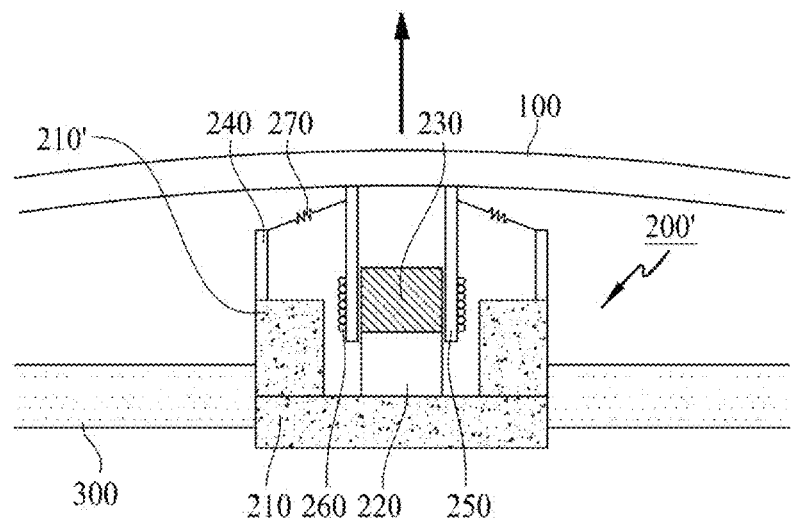
FIGS. 4A and 4B illustrate a sound generating operation method of a sound generation device with a second structure according to an example embodiment of the present disclosure.
Figure 4B:
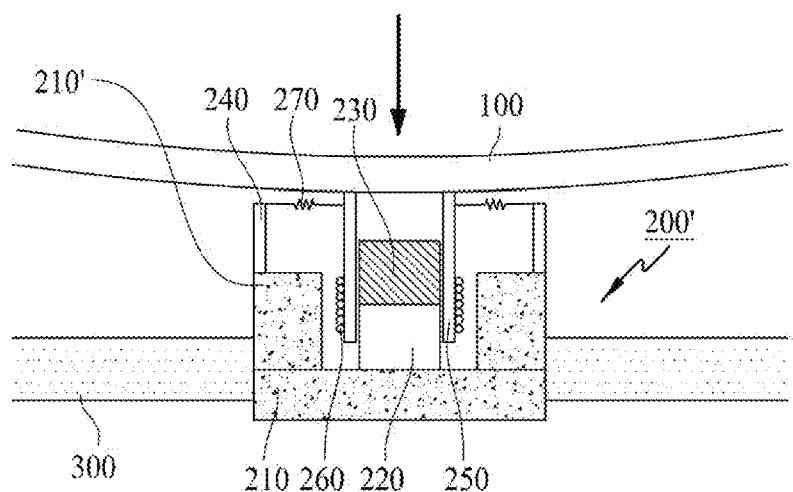

FIGS. 4A and 4B illustrate a sound generating operation method of a sound generation device with a second structure according to an example embodiment of the present disclosure.

FIG. 4A illustrates a state in which a current is applied. The second plate 210' becomes an S-pole, and the center pole 230 connected to an upper surface of the magnet 220 becomes an N-pole, whereby an external magnetic field may be generated between coils 260. The S-pole and the N-pole may be interchanged. If so, the sound generation device may similarly operate by changing a winding direction of the coil 260. In this state, when a current for generating a sound is applied to the coil 260, an applied magnetic field may be generated around the coil 260, whereby a force for upwardly moving the bobbin 250 may be generated by the applied magnetic field and the external magnetic field. For example, when the current is applied to the coil 260, the magnetic field may be generated around the coil 260, and the external magnetic field may be generated by the magnet 220, whereby the entire bobbin 250 may be guided and moved upward by the center pole 230 according to Fleming's Left-Hand Rule for Motors.

Accordingly, as one surface of the bobbin 250 may contact a rear surface of the display panel 100, the bobbin 250 may vibrate the display panel 100 in an upward direction (illustrated as an arrow) according to whether or not the current is applied to the coil 260, and a sound wave (or sound) may be generated by the vibration of the display panel 100. In this state, when the current stops or a reverse current is applied, as shown in FIG. 4B, a force of downwardly moving the bobbin 250 may be generated according to principles similar to the above description with reference to FIG. 4A, and the display panel 100 may be vibrated in a downward direction (illustrated as an arrow).

The damper 270 may be between the frame 240 and some portion of an upper side of the bobbin 250. The damper 270 may have a wrinkled structure, having elasticity, whereby the damper 270 may control the up-and-down vibration of the bobbin 250 by contraction and relaxation movements in accordance with the up-and-down movement of the bobbin 250. That is, the damper 270 may be connected to the bobbin 250 and the frame 240, and the up-and-down vibration of the bobbin 250 may be controlled (or dampened) by a restoring force of the damper 270. For example, if the bobbin 250 vibrates to be higher or lower than a predetermined height, the bobbin 250 may be restored to its original position by the restoring force of the damper 270. Accordingly, the display panel 100 may be vibrated in the up-and-down direction in accordance with the direction and level of the current applied to the coil 260, to thereby generate a sound wave by the vibration.

Figure 5A:
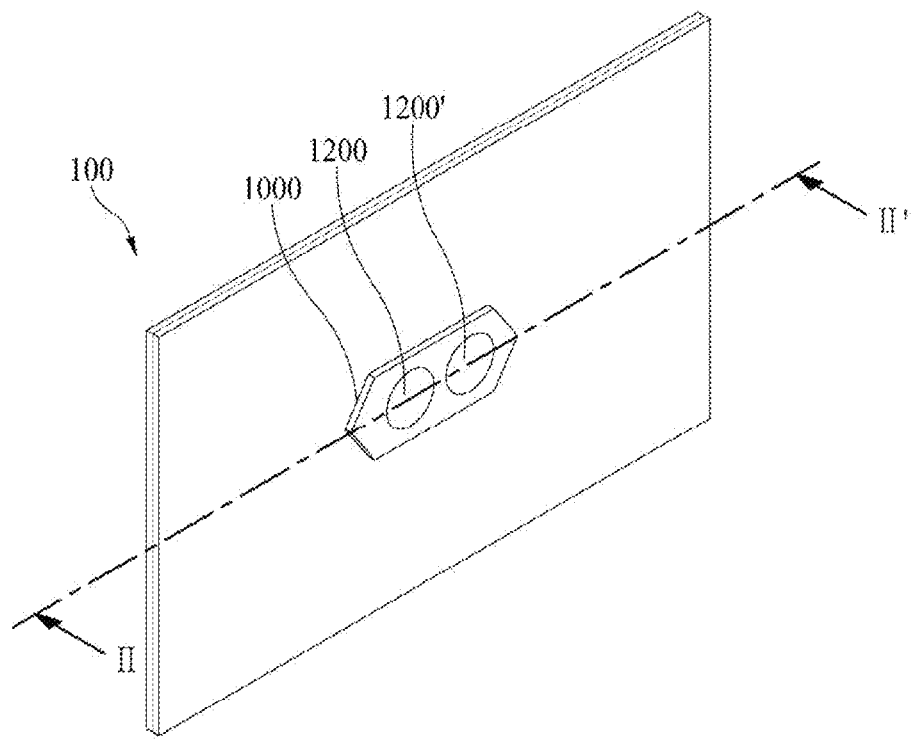
FIG. 5A illustrates a display apparatus including a sound generation device according to another example embodiment of the present disclosure.
Figure 5B:
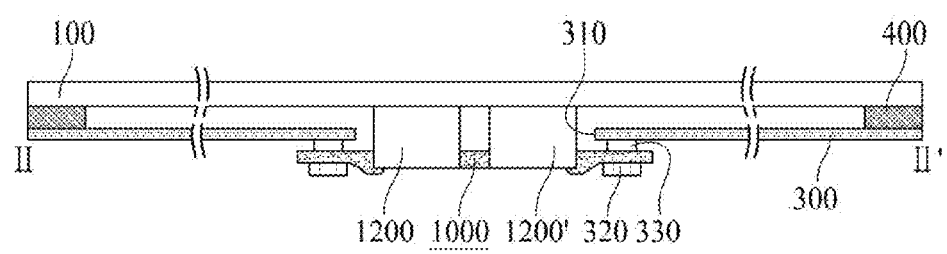
FIG. 5B is a cross-sectional view taken along line II-IF of FIG. 5A.

FIG. 5A illustrates a display apparatus including a sound generation device according to another example embodiment of the present disclosure. FIG. 5B is a cross-sectional view taken along line II-IF of FIG. 5A.

With reference to FIG. 5A, a display apparatus may include a display panel 100, and first and second sound generation devices 1200 and 1200', for generating sound by vibrating the display panel 100. The first sound generation device 1200 and the second sound generation device 1200' may be adjacent to each other. If the plurality of sound generation devices are provided and spaced apart from one another, it may be difficult to maintain a contact characteristic between the sound generation devices and the display panel, which may cause deterioration of sound quality by interference and delay phenomenon of the sound wave generated in the plurality of sound generation devices. Thus, in comparison to a structure in which the plurality of sound generation devices are spaced apart from each other, a structure according to an embodiment of the present disclosure in which sound generation devices are adjacent to each other may reduce interference or delay phenomenon of the sound wave generated in the sound generation devices, to thereby improve the sound output characteristic. This will be described below with reference to FIG. 7.

The first structure or the second structure described above with reference to FIGS. 2A and 2B may be applied to a structure of each of the first sound generation device 1200 and the second sound generation device 1200'. The bobbin or the voice coil of the sound generation device according to an embodiment of the present disclosure may be configured in a circular shape or an oval shape. If the bobbin or the voice coil is configured in an oval shape, a sound having a high-pitched sound band may be improved in comparison with a circular shape, and the occurrence of heat caused by a vibration of the bobbin or the voice coil may be reduced, thereby enhancing a heat dissipation characteristic.

For example, the display apparatus may include a fixing device 1000 for fixing the first sound generation device 1200 and the second sound generation device 1200'. The fixing device 1000 may include a mold structure manufactured by a molding process, e.g., using a plastic material, but embodiments are not limited thereto. The fixing device 1000 will be described in detail below with reference to FIG. 6.

With reference to FIG. 5B, a display apparatus may include a first sound generation device 1200, a second sound generation device 1200', and a supporting member 300. The supporting member 300 may support one or more of a rear surface and a side surface of a display panel 100. The supporting member 300 may be a plate-shaped member, e.g., a metal or plastic material, over a rear surface of the display panel 100, around, or on an entire surface of the display panel 100.

The sound generation devices 1200 and 1200' may be accommodated in a supporting hole 310 of the supporting member 300. If the sound generation devices 1200 and 1200' is inserted into and fixed to the supporting hole 310, it is possible to decrease or reduce a height of the sound generation devices 1200 and 1200' between the rear surface of the display panel 100 and an inner surface of the supporting member 300, to thereby realize a relatively small space or area for generating the sound.

For example, the display apparatus may include a nut 330 fixed to the supporting member 300. The fixing device 1000 may be fixed to the nut 330 by a screw 320 inserted into a mounting hole of the fixing device 1000. For example, a screw-through hole may be provided in an inner surface of the nut 330. Thus, after a mounting hole of the fixing device 1000 is aligned with the screw-through hole of the nut 330, the fixing device 1000 may be fixed to the supporting member 300 by fastening (or tightening) the screw 320.

In one example, the nut 330 may be a self-clinching nut. An example of the self-clinching nut may be a PEM® nut, although embodiments are not limited thereto. If the self-clinching nut is used, some of a vibration generated in the first sound generation device 1200 and the second sound generation device 1200' may be absorbed by the self-clinching nut. Thus, a vibration transferred to the supporting member 300 may be reduced.

In the display apparatus according to an embodiment of the present disclosure, the supporting member and the sound generation device may be fixed to each other by the use of nut and screw included in the supporting member. Thus, a thickness of the display panel 100 can be reduced.

An adhesive member 400 may be disposed in a periphery of each of the display panel 100 and the supporting member 300, and may attach the display panel 100 on the supporting member 300. The adhesive member 400 may include a double-sided tape and/or the like, although embodiments are not limited thereto.

Figure 6:
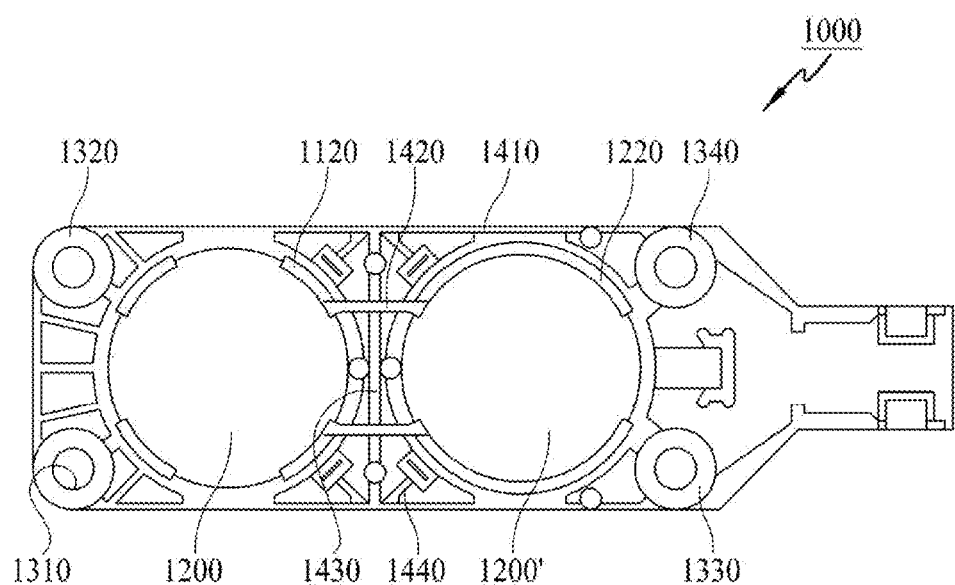
FIG. 6 illustrates a sound generation device according to another example embodiment of the present disclosure.

FIG. 6 illustrates a sound generation device according to another example embodiment of the present disclosure.

With reference to FIG. 6, the fixing device 1000 of the sound generation device may be an integrated fixing device for supporting and fixing the first sound generation device 1200 and a second generation device 1200' to be adjacent to each other. Therefore, the first sound generation device 1200 and the second generation device 1200' fixed by the fixing device 1000 may be referred to as a pair of sound generation devices, and hereinafter, will be described as a pair of sound generation devices.

The fixing device 1000 of the sound generation device may include a supporting part that may support the sound generation devices 1200 and 1200', a plurality of rib parts near the sound generation devices 1200 and 1200', and a plurality of mounting holes for fixing the fixing device 1000 to the supporting member 300. For example, the supporting part may include a first supporting part 1120 for supporting the first sound generation device 1200 and a second supporting part 1220 for supporting the second generation device 1200'. The first supporting part 1120 may be a structure for supporting a portion of each of a side surface and a rear surface of the first sound generation device 1200 and may have a cylindrical or a cylinder shape, and the second supporting part 1220 may be a structure for supporting a portion of each of a side surface and a rear surface of the second generation device 1200', and may have a cylindrical or a cylinder shape.

The first supporting part 1120 and the second supporting part 1220 may further include protrusions having two or four arc shapes. One surface of each of the protrusion portions may be bent toward an inner side of each of the first and second sound generation devices 1200 and 1200', and may support a portion of a rear surface of each of the first and second sound generation devices 1200 and 1200', thereby reducing or preventing the first and second sound generation devices 1200 and 1200' from deviating to the outside of the fixing device 1000 of the sound generation device.

A plurality of rib parts may be near the first supporting part 1120 and the second supporting part 1220, thereby maintaining a rigidity of the fixing device 1000 of the sound generation device and preventing the fixing device 1000 of the sound generation device from being deformed even when being used for a long time. For example, the rib parts may include a first rib part 1410 extending in a widthwise direction from an outer portion of each of the first and second supporting parts 1120 and 1220, a second rib part 1420 connecting the first supporting part 1120 to the second supporting part 1220 in the widthwise direction, and a third rib part 1430 connected to the first rib part 1410 in a lengthwise direction. Here, the widthwise direction may be a direction toward a long side on which two sound generation devices are disposed, and the lengthwise direction may be a direction vertical or perpendicular to the widthwise direction. The first rib part 1410 may extend from the outer portion of the first and second supporting parts 1120 and 1220 in the horizontal direction, to form a widthwise-direction outer structure of the fixing device 1000 of the sound generation device.

In a central region (e.g., a central region between the first supporting part 1120 and the second supporting part 1220) of the first rib part 1410, the first rib part 1410 may be provided greater in height and thickness than both side areas of the first rib part 1410. Therefore, even when a pair of sound generation devices vibrates for a long time, a fixing device of the pair of sound generation devices may not be deformed, and a change in the relative position between the pair of sound generation devices and the display panel may be reduced.

One or more second rib parts 1420, where the first supporting part 1120 and the second supporting part 1220 are located, may be connected to each other as one body. The one or more second rib parts 1420 may be disposed inside the first rib part 1410. In the FIG. 6 example, two of the second rib parts 1420 are illustrated as being provided, but embodiments are not limited to this configuration. For example, one, three, or more of the second rib part 1420 may be provided.

One or more third rib parts 1430, connected to the first and second rib parts 1410 and 1420 as one body and extend in the widthwise direction, may be provided between two second rib parts 1420 or between two first rib parts 1410. In the FIG. 6 example, a structure in which one third rib part 1430 is provided and extends a long distance or in a lengthwise direction between two first rib parts 1410 is illustrated. However, embodiments are not limited to this configuration. For example, and the third rib part 1430 may extend a shorter distance between two of the second rib parts 1420.

One or more fourth rib parts 1440, obliquely extending between the first supporting part 1120 or the second supporting part 1220 and the first rib part 1410, may be further provided. The fourth rib part 1440 may reduce or prevent the bending deformation of the fixing device 1000 of the sound generation device caused by long-time driving of the sound generation device. Therefore, because the display apparatus according to an example embodiment of the present disclosure includes the fixing device fixing the pair of sound generation devices and the plurality of rib parts near the sound generation devices, the rigidity or hardness of the sound generation devices is maintained, and a sound characteristic change caused by a long-time operation is reduced.

Moreover, a distance between the first supporting part 1120 and the second supporting part 1220 may be greater than a minimum threshold value that may enable formation of the rib part, and may be smaller than a maximum threshold value corresponding to a diameter of each of the first sound generation device 1200 and the second sound generation device 1200'. If the distance between the first supporting part 1120 and the second supporting part 1220 is greater than the minimum threshold value, the degradation in sound quality may be reduced. Therefore, the distance between the first supporting part 1120 and the second supporting part 1220 may be smaller than the diameter of each of the first sound generation device 1200 and the second sound generation device 1200'. Thus, the degradation in sound quality may be reduced or prevented. For example, if a size (or a diameter) of the sound generation device is "D," the distance between the first supporting part 1120 and the second supporting part 1220 may be a value larger than, e.g., about 7 mm, corresponding to an example minimum threshold value. In one example, the change in sound quality characteristic is not greater in an example in which the size D of the sound generation device is, e.g., about 28 mm, than an example in which the size D of the sound generation device is about 0.85*D (e.g., about 23.6 mm).

A plurality of mounting holes for fixing the fixing device 1000 to the supporting member 300 may be provided. When the hole is provided in the inner surface of the nut 330 illustrated in FIG. 5B, a plurality of mounting holes 1310, 1320, 1330, and 1340 of the fixing device 1000 may be aligned with the hole of the nut 330. Then, by fastening the screw 320, the fixing device 1000 may be fixed to the supporting member 300.

Figure 7:
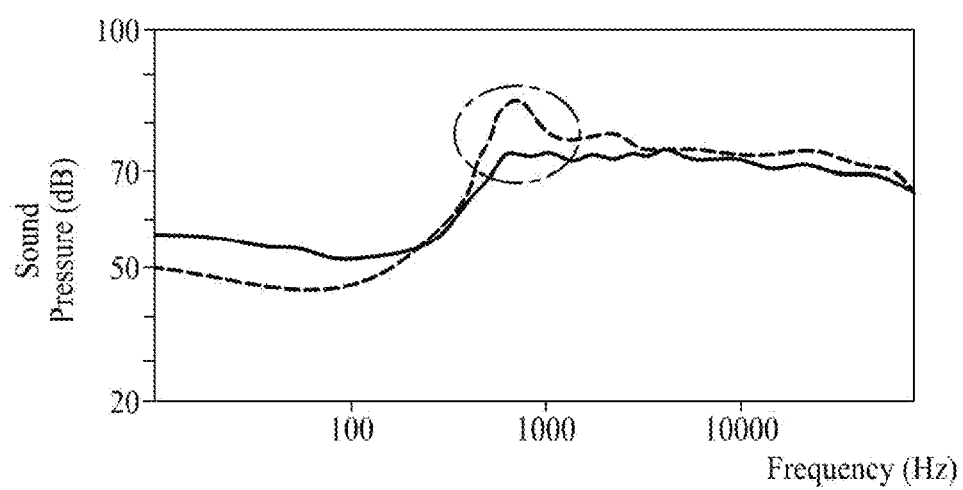
FIG. 7 is a diagram showing a sound output characteristic of a sound generation device according to another example embodiment of the present disclosure.

FIG. 7 is a diagram showing a sound output characteristic of a sound generation device according to another example embodiment of the present disclosure.

In FIG. 7, the abscissa axis (x-axis) represents a frequency (Hz), and the ordinate axis (y-axis) represents a sound pressure in decibels (dB). A sound output characteristic may be measured by a sound analysis apparatus. The sound analysis apparatus may include a sound card for transmitting sound to or receiving sound from a control personal computer (PC), an amplifier for amplifying a signal generated from the sound card and transfers the amplified signal to a sound generation device, and a microphone for collecting a sound generated by the sound generation device in a display panel. The sound collected through the microphone may be input to the control PC through the sound card, and a control program may check the input sound to analyze the sound of the sound generation device.

In FIG. 7, a dotted line represents a case in which two sound generation devices spaced apart from each other are provided and fixed individually. Based on experimental results, it can be seen that a dip occurs where a sound pressure rapidly increases in a frequency band of 800 Hz to 900 Hz (shown in a circle). In the dip, a strong sound pressure is generated in a specific frequency due to delay or interference between sound waves generated by the two sound generation devices that are spaced apart from each other and are individually fixed. Therefore, it is recognized that sound quality is wholly degraded.

Moreover, in FIG. 7, a solid line represents a case in which a fixing device 1000 which fixes a pair of sound generation devices as one body is used as in an embodiment of the present disclosure. Based on experimental results, it can be seen that the dip, where a sound pressure abnormally increases in a certain frequency, is considerably reduced in comparison with the dotted line case. Therefore, if a pair of sound generation devices according to another embodiment of the present disclosure is applied, it can be seen that a uniform sound pressure is generated in a whole frequency band. Thus, a good sound output characteristic may be realized.

Figure 8A:
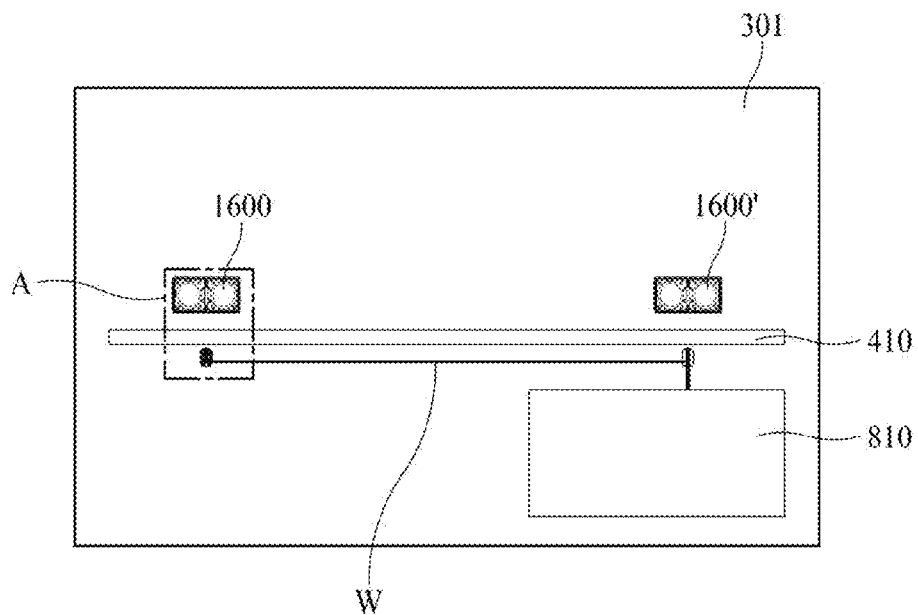
FIG. 8A illustrates a rear surface of a supporting member according to an example embodiment of the present disclosure.
Figure 8B:
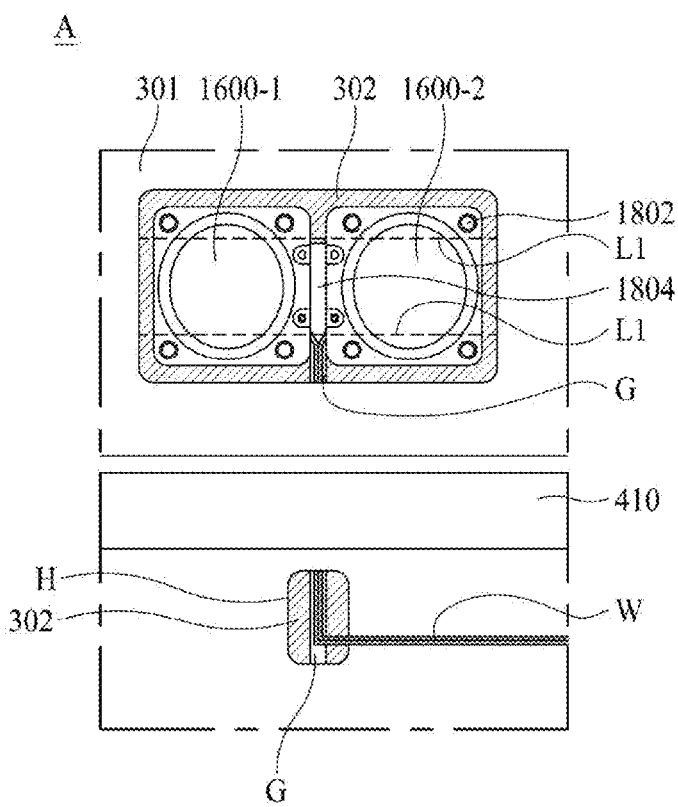
FIG. 8B illustrates portion "A" of FIG. 8A.
Figure 8C:
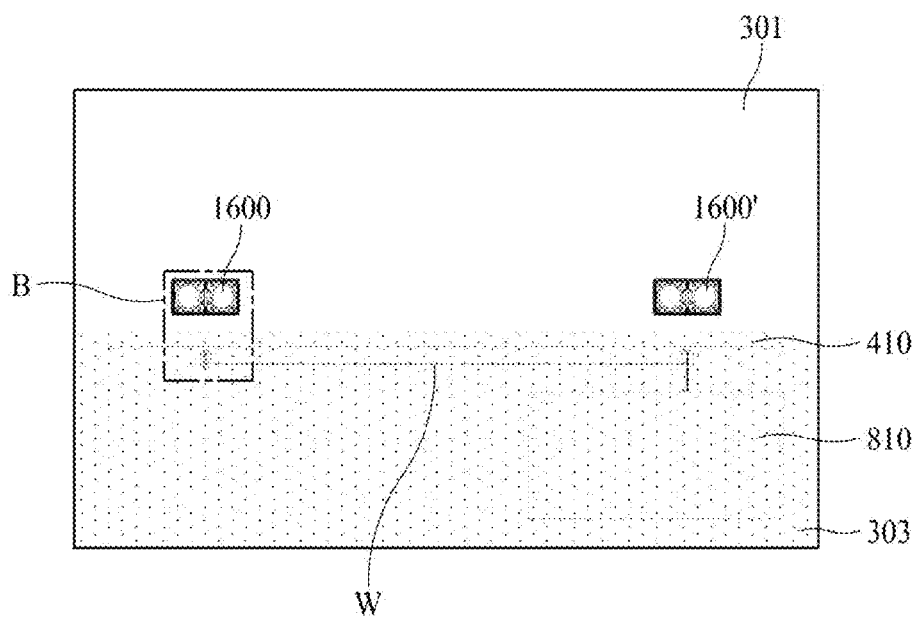
FIG. 8C illustrates a rear surface of a supporting member and a rear cover according to an example embodiment of the present disclosure.
Figure 8D:
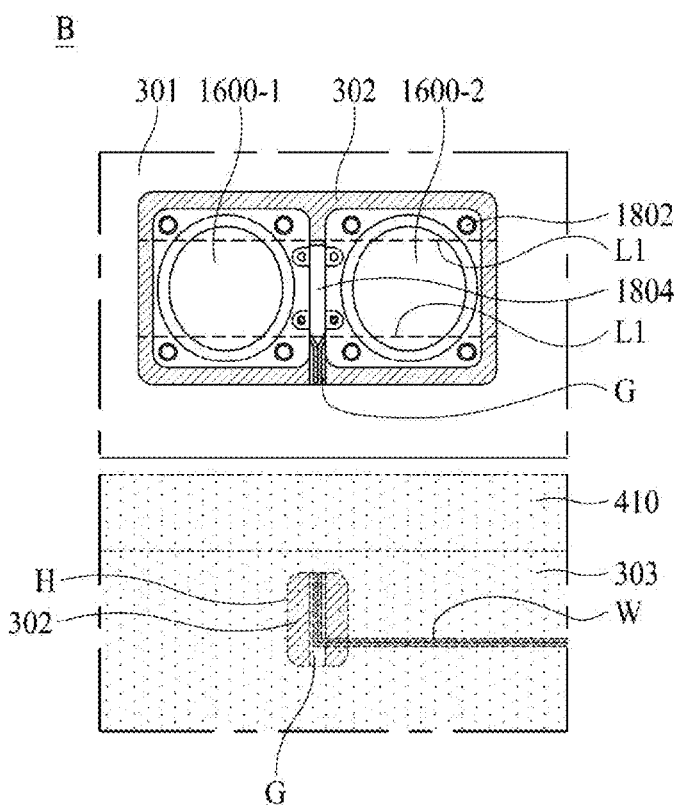
FIG. 8D illustrates portion "B" of FIG. 8C.

FIG. 8A illustrates a rear surface of a supporting member according to an example embodiment of the present disclosure. FIG. 8B illustrates portion "A" of FIG. 8A. FIG. 8C illustrates a rear surface of a supporting member and a rear cover according to an example embodiment of the present disclosure. FIG. 8D illustrates portion "B" of FIG. 8C.

With reference to FIG. 8A, a first sound generation device 1600 and a second generation device 1600' may be disposed on a first supporting member 301. A rigid bar 410 may be disposed on the first supporting member 301. The rigid bar 410 may provide rigidity to a display panel, and may reduce or prevent the display panel from being twisted or distorted or bent.

With reference to FIG. 8C, a rear cover 303 may be disposed on a rear surface of a first supporting member 301. The rear cover 303 may finally cover a display module, and a final product may be finished.

A wiring for supplying a signal to the first sound generation device 1600 and the second generation device 1600' is needed for vibrating the first sound generation device 1600 and the second generation device 1600'. The wiring may be supplied with a signal from a driving circuit unit 810, and thus, may be connected to the driving circuit unit 810.

The wiring may be exposed at the first supporting member 301 and may be fixed by a tape and/or the like, although embodiments are not limited thereto. Therefore, the inventors have recognized that, when the wiring is exposed at the first supporting member 310, the wiring is unable to externally provide a good design effect or aesthetic. Therefore, the inventors have performed various experiments for implementing a hidden wire structure for a wiring to be hidden by a supporting member. Details of the experiments will be described below with reference to FIGS. 8A and 8C.

The first sound generation device 1600 and the second sound generation device 1600', each including a wiring W, may be disposed inside the rear cover 303, for hiding a portion of the wiring exposed at the first supporting member 301. For example, the exposed portion of the wiring may be hidden by the rear cover 303. When the first sound generation device 1600 and the second sound generation device 1600' are inside the rear cover 303, various circuit boards, in addition to the driving circuit unit 810, may be installed in a portion covered by the rear cover 303. Accordingly, the inventors have recognized that a space where the first sound generation device 1600 and the second sound generation device 1600' are to be disposed may be limited.

The wiring for supplying the signal to the first sound generation device 1600 and the second sound generation device 1600' may be between the rigid bar 410 and each of the first sound generation device 1600 and the second sound generation device 1600'. For example, the rigid bar 410 may be disposed on the first supporting member 301 without a step height, but a step height may occur between the first supporting member 301 and the rigid bar 410 due to the wiring. Also, an additional structure for hiding the wiring may be provided. Therefore, the inventors have recognized that the wiring should be disposed to extend downward along an outer portion of the rigid bar 410 for a step height to not occur in the first supporting member 301. For example, the inventors have recognized that it is difficult to externally provide a sense of beauty or aesthetic, and the number of processes may increase due to the inclusion of an additional structure.

Because the rigid bar 410 and the driving circuit unit 810 are covered by the rear cover 303, the rigid bar 410 may be disposed on an upper side of the first supporting member 301. For example, the rigid bar 410 may be on the upper side of the first supporting member 301 or in a region close to the display panel, and the first sound generation device 1600 and the second sound generation device 1600' may be under the rigid bar 410. For example, the inventors have recognized that a width of the rigid bar 410 may be widened due to a width of each of the first sound generation device 1600 and the second sound generation device 1600'. Thus, it may be difficult to realize a good or visually pleasing design.

Therefore, the inventors have recognized that a wiring for applying a signal to a sound generation device should lay out to not be exposed at a rear surface of a supporting member, and an exposed portion of the wiring should be designed to be covered by a rear cover. As a result, the inventors have invented a display apparatus including a new sound generation device, in which a wiring is efficiently disposed without affecting an external appearance of a supporting member.

Therefore, a groove into which a wiring is accommodated or inserted may be provided in (or defined by) a supporting member for the wiring to not be exposed, and a hole may be provided in the supporting member for the wiring to extend to a rear surface of the supporting member. Also, a portion of the wiring exposed at the rear surface of the supporting member may be covered by a rear cover. Thus, the wiring may not be exposed at the rear surface of the supporting member. As a result, the inventors have invented a display apparatus having a new structure. The display apparatus having the new structure will be described below with reference to FIGS. 8A to 8D.

With reference to FIG. 8A, a first sound generation device 1600 and a second sound generation device 1600' may be adjacent to the one sound generation device described above with reference to FIGS. 1 to 4. Also, the first sound generation device 1600 and the second sound generation device 1600' may be respectively disposed in a left region and a right region of a first supporting member 301. It should be appreciated that "left" and "right" are interchangeable as would be understood to one of ordinary skill in the art. Here, the first supporting member 301 may be the supporting member described above with reference to FIGS. 1 to 6. Also, the first supporting member 301 may be referred to as a "back cover," and a second supporting member 302 may be referred to as an "inner plate."

A driving circuit unit 810 or a main board including at least one printed circuit board (PCB) may be disposed in a lower portion of the first supporting member 301. The driving circuit unit 810 may provide an interface that may enable a display panel to operate.

The at least one PCB may be a power supply. The power supply may supply power to the display panel. For example, the power supply may convert an alternating current (AC) frequency into a direct current (DC) frequency.

The at least one PCB may be a timing controller board. The timing controller board may transfer an input signal to the display panel. For example, the timing controller board may transfer, to a source PCB, timing signals for controlling the source PCB and a video signal. Also, the timing controller board may control an image. The timing controller board may be connected to the source PCB by using one of a flat flex cable (FFC), a circular cable, and wireless transmission. For example, the timing controller board may include a controller for controlling operations of a data driver and a gate driver and a power management integrated circuit (IC) (PMIC) that may supply various voltages or currents to the display panel, the data driver, and the gate driver and controls the various voltages or currents which are to be supplied.

The data driver may supply data voltages to a plurality of data lines to drive the plurality of data lines. The data driver may be referred to as a "source driver." The data driver may include at least one source driver IC, and may drive the plurality of data lines.

The source driver IC may be connected to a pad of the display panel in a tape automated bonding (TAB) type or a chip-on-glass (COG) type, or may be directly provided in the display panel. In some examples, the source driver IC may be integrated and provided in the display panel. Alternatively, the source driver IC may be implemented as a chip-on-plastic (COP) type or a chip-on-film (COF) type, which may be mounted on a film connected to the display panel.

The gate driver may supply a gate voltage to a plurality of gate lines to drive the plurality of gate lines. The gate driver may be referred to as a "scan driver." The gate driver may include at least one gate driver IC, and may drive the plurality of gate lines.

The at least one source driver IC may be mounted on the source PCB, or the source PCB may be connected to a COF on which the at least one source driver IC may be mounted. The source PCB may be connected to the display panel and the COF, and may be disposed on a lower rear surface of the display panel. A wiring W for applying a signal to the first sound generation device 1600 and the second sound generation device 1600' may be connected to the driving circuit unit 810.

Descriptions of the first sound generation device 1600 and the second sound generation device 1600' are substantially similar to descriptions given above with reference to FIGS. 1 to 4, and thus, are not repeated. Also, in FIG. 8B, a sound generation device is briefly illustrated, and the first sound generation device 1600 will be described as an example.

According to some embodiments of the present disclosure, a bobbin or a voice coil of a sound generation device may be configured in a circular shape or an oval shape. If the bobbin or the voice coil is configured in an oval shape, a sound having a high-pitched sound band is improved in comparison with a circular shape, and the occurrence of heat caused by a vibration of the bobbin or the voice coil may be reduced, thereby enhancing a heat dissipation characteristic.

Moreover, according to some embodiments of the present disclosure, a sound generation device including two sound generation devices may be provided, and a signal or a current applied to the sound generation device may be divided into two signals or two currents, thereby reducing the occurrence of heat caused by a vibration of the sound generation device. Therefore, the occurrence of heat may be reduced, and thus, reliability may be enhanced. Also, when the sound generation device including the two sound generation devices is provided, a sound output characteristic may be doubly improved, thereby enhancing a sound pressure. Also, the sound generation device including the two sound generation devices may be provided in at least two of a first region, a second region, and a third region. Thus, two sub-sound generation devices corresponding to each of the first to third regions may output sounds having the same sound band, thereby increasing a sound pressure. Moreover, when the sound generation device including the two sound generation devices is provided, a size of the sound generation device may be reduced in comparison with a pair of sound generation devices, thereby providing a display apparatus including a slimmer sound generation device.

With reference to FIG. 8B, the first sound generation device 1600 may be disposed on the second supporting member 302. The first sound generation device 1600 may be fixed to the second supporting member 302 by a plurality of mounting holes 1802. For example, the first sound generation device 1600 may be fixed to the second supporting member 302 by a screw and a nut, which may be inserted into each of a plurality of mounting holes 1802. This will be described below with reference to FIG. 9. In FIG. 8B, L1 refers to a portion where the second supporting member 302 is disposed.

A groove G, into which a wiring W for applying a signal to a 1-$1^{st}$ sound generation device 1600-1 and a 1-$2^{nd}$ sound generation device 1600-2 is inserted or accommodated, may be provided in the second supporting member 302. The wiring W may be inserted or accommodated into the groove G. Thus, the wiring W may not be exposed at a rear surface of the first supporting member 301.

Therefore, the wiring W for applying the signal to the 1-$1^{st}$ sound generation device 1600-1 and the 1-$2^{nd}$ sound generation device 1600-2 may be disposed in the groove G of the second supporting member 302. The groove G may be provided between the 1-$1^{st}$ sound generation device 1600-1 and the 1-$2^{nd}$ sound generation device 1600-2. For example, the groove G may be provided in a terminal 1804, which may connect the 1-$1^{st}$ sound generation device 1600-1 to the 1-$2^{nd}$ sound generation device 1600-2. Also, the groove G may be a path into which the wiring W may be accommodated and through which the wiring W may pass, and may be referred to as a "wire guide groove."

A plurality of terminals 1804 may be disposed between the 1-$1^{st}$ sound generation device 1600-1 and the 1-$2^{nd}$ sound generation device 1600-2, which may be included in the first sound generation device 1600. The terminal 1804 may connect the 1-$1^{st}$ sound generation device 1600-1 to the 1-$2^{nd}$ sound generation device 1600-2, and may act as a connection terminal for applying the signal to the 1-$1^{st}$ sound generation device 1600-1 and the 1-$2^{nd}$ sound generation device 1600-2. Two signals (for example, a + signal and a − signal) may be applied to the terminals 1804, and the terminals 1804 may be serially connected to each other. The terminal 1804 may be provided in pairs, and a signal may not be applied to one of the pair of terminals and may be applied to the other terminal of the pair.

The wiring W accommodated into the groove G may apply the signal to the 1-$1^{st}$ sound generation device 1600-1 and the 1-$2^{nd}$ sound generation device 1600-2 through the respective terminals 1804. Moreover, the wiring W accommodated into the groove G of the second supporting member 302 may pass by a portion under the rigid bar 410.

A hole H may be provided in the first supporting member 301. The hole H may enable the wiring W accommodated into the groove G to extend to a rear surface of the first supporting member 301. For example, the hole H of the first supporting member 301 may be provided in an end of the groove G of the second supporting member 302. The wiring W provided in the groove G may extend to the rear surface of the first supporting member 301 through the hole H. The wiring W extending to the rear surface of the first supporting member 301 may be connected to the driving circuit unit 810.

As in the first sound generation device 1600, the second sound generation device 1600' may also include a wiring W accommodated into the groove G, and the wiring W provided in the groove G may extend to the rear surface of the first supporting member 301 through the hole H of the first supporting member 301. The wiring W extending to the rear surface of the first supporting member 301 may be connected to the driving circuit unit 810.

With reference to FIGS. 8C and 8D, a rear cover 303 may be disposed on a rear surface of a first supporting member 301. A wiring W extending to the rear surface of the first supporting member 301, a driving circuit unit 810, and a rigid bar 410 may be covered by the rear cover 303. In FIG. 8D, L1 refers to a portion where a second supporting member 302 is disposed.

Therefore, the wiring W for supplying a signal to a sound generation device may be accommodated into a groove of the second supporting member 302 and may not be exposed at the rear surface of the first supporting member 301, and the wiring W extending to the rear surface of the first supporting member 301 may be covered by the rear cover 303 and may not be seen at the rear surface of the first supporting member 301. Therefore, a clean-looking display apparatus may be provided for users. Also, a display apparatus including a supporting member having a hidden wire structure may be provided. Accordingly, a display apparatus having a clean-looking design may be provided based on the hidden wire structure.

Moreover, when the wiring W for supplying the signal to the sound generation device is accommodated into the groove of the second supporting member 302 and the wiring W extending to the rear surface of the first supporting member 301 may be covered by the rear cover 303, the wiring W may not be exposed at the rear surface of the first supporting member 301, thereby solving a problem in which a separate structure for covering a wiring may be provided through an additional process.

Moreover, when the wiring W for supplying the signal to the sound generation device is accommodated into the groove of the second supporting member 302 and the wiring W extending to the rear surface of the first supporting member 301 may be covered by the rear cover 303, the wiring W may not be exposed at the rear surface of the first supporting member 301, thereby solving a problem in which, due to the a width of a rigid bar or a width of a sound generation device, it is difficult to have a good design effect in a display apparatus.

In FIGS. 8A to 8D, two sound generation devices disposed adjacent to each other have been described above as an example, and the description given above with reference to FIGS. 8A to 8D may be identically applied to the one sound generation device of FIGS. 1A to 4B or the pair of sound generation devices of FIGS. 5A to 7.

Figure 9:
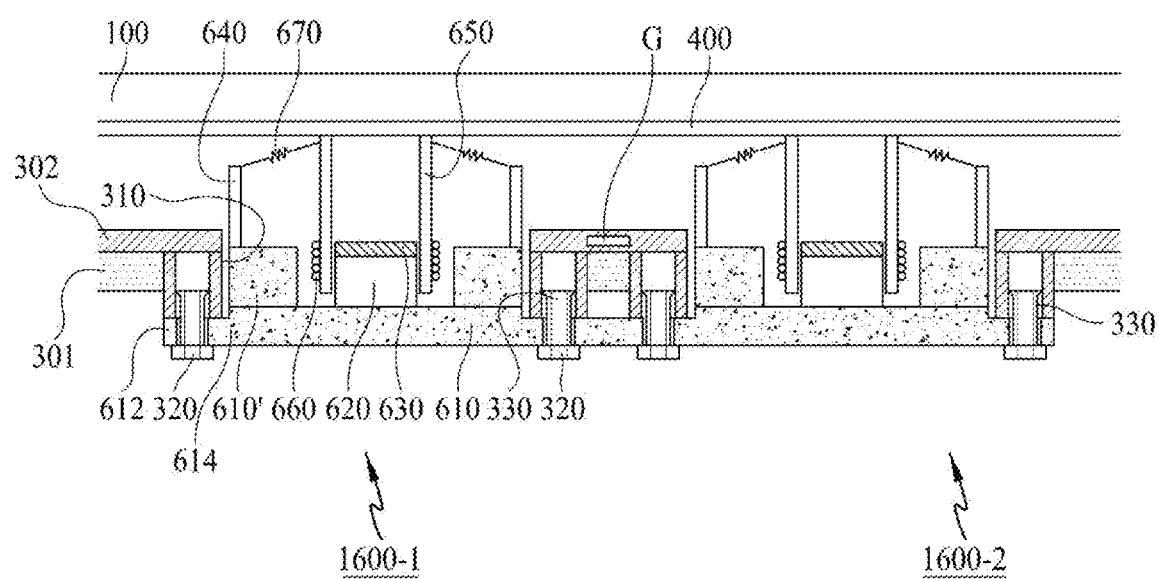
FIG. 9 illustrates a connection structure of a supporting member and a sound generation device according to an example embodiment of the present disclosure.

FIG. 9 illustrates a connection structure of a supporting member and a sound generation device according to an example embodiment of the present disclosure. The first sound generation device of FIG. 8A will be described below with reference to FIG. 9 for example.

With reference to FIG. 9, a 1-$1^{st}$ sound generation device 1600-1 and a 1-$2^{nd}$ sound generation device 1600-2 (in a first sound generation device 1600) may each include a magnet 620 on a first plate 610, a center pole 630 on the magnet 620, a bobbin 650 near the magnet 620 and the center pole 630, and a coil 660 wound around the bobbin 650. Also, a second plate 610' may be at an outer periphery of the first plate 610, and a frame 640 may be disposed outside the second plate 610'. A damper 670 may be between the frame 640 and the bobbin 650. A sound generation device is substantially similar to the description given above with reference to FIG. 2, and a detailed description is not repeated.

In FIG. 9, a second structure is illustrated, and a first structure may also be similarly applied. A diameter enlargement part 614 may be provided as one body with the first plate 610 of each of the 1-1$^{st}$ sound generation device 1600-1 and the 1-2$^{nd}$ sound generation device 1600-2. The first plate 610 of the first sound generation device 1600 may have a cylindrical shape, and a protrusion may be provided on one side of the first plate 610. The protrusion may be greater than a diameter of the other portion of the first plate 610. A protrusion region having an enlarged diameter may be referred to as a diameter enlargement part 614. The diameter enlargement part 614 may be provided in a ring shape. An extension part 612 for fixing the 1-1$^{st}$ sound generation device 1600-1 and the 1-2$^{nd}$ sound generation device 1600-2 may be provided in a portion of the diameter enlargement part 614.

A screw 320 and a nut 330 may be provided in the extension part 612. The nut 330 may be, for example, a self-clinching nut. Examples of the self-clinching nut may include a PEM® nut. The 1-1$^{st}$ sound generation device 1600-1 and the 1-2$^{nd}$ sound generation device 1600-2 may be fixed to a first supporting member 301 by the nut 330 and the screw 320. A groove G, through which a wiring may pass, may be provided between the 1-1$^{st}$ sound generation device 1600-1 and the 1-2$^{nd}$ sound generation device 1600-2.

If the self-clinching nut is used for connecting the first supporting member 301 to the first sound generation device 1600, some of a vibration generated by the first sound generation device 1600 may be absorbed by the self-clinching nut. Thus, a vibration transferred to the first supporting member 301 may be reduced. When the first supporting member 301 is directly connected to the first sound generation device 1600 without the self-clinching nut, a vibration occurring when the first sound generation device 1600 operates may be transferred to the first supporting member 301 for a long time. Thus, if the first supporting member 301 is thinly provided, the first supporting member 301 may be bent or deformed. Also, when the first supporting member 301 is thin, because the first sound generation device 1600 is directly connected to the screw 320 of the first supporting member 301, a fixing force between the first supporting member 301 and the first sound generation device 1600 may not be sufficient.

Therefore, when a nut is provided for fixing a sound generation device to a supporting member, a thickness of the supporting member may be thickened for reducing or preventing the bending or deformation of the supporting member and enhancing a fixing force between the supporting member and the sound generation device. When the thickness of the supporting member is increased, a thickness of a display apparatus is increased. Also, if the supporting member is formed of glass or stainless steel for improving an external design of the display apparatus, a nut may not be inserted into the supporting member.

Therefore, a second supporting member 302 may be further provided on the first supporting member 301 for the nut 330 to be inserted into the first supporting member 301. The second supporting member 302 may be closer to a display panel 100 than the first supporting member 301.

Moreover, the second supporting member 302 may be formed of, e.g., aluminum (Al). Thus, the nut 330 may be inserted into the second supporting member 302. The first sound generation device 1600 may be connected to the first supporting member 301 and the second supporting member 302 by the screw 302 by using the nut 330 fixed to the first supporting member 301. Also, the first supporting member 301 and the second supporting member 302 may be fixed by an adhesive member. The adhesive member may include a double-sided tape and/or the like, but embodiments are not limited thereto.

The first supporting member 301 may be formed of glass, stainless steel, and/or the like, and thus, an external design of a display apparatus is improved. However, embodiments are not limited thereto. When the second supporting member 302 is additionally provided, the first sound generation device 1600 may be closer to a front surface of the display panel 100 by a distance corresponding to a thickness of the first supporting member 301, thereby reducing a thickness of the display apparatus. Therefore, when the second supporting member 302 is further provided, a sound generation device may be provided to be thinner, thereby reducing the thickness of the display apparatus.

An adhesive member 400 for attaching the first sound generation device 1600 on the display panel 100 may be provided. A heat dissipation member may be further provided between the display panel 100 and the adhesive member 400, for dissipating heat that may occur when the first sound generation device 1600 vibrates. The heat dissipation member may reduce or prevent heat from the first sound generation device 1600 from flowing or penetrating into the display panel 100. Therefore, the heat dissipation member may diffuse the heat from the first sound generation device 1600 to a wide region, thereby reducing or preventing the image quality of the display panel 100 from being degraded by a sudden temperature change in a local region of the display panel 100 overlapping the first sound generation device 1600.

Moreover, the heat dissipation member may have a polygonal plate shape or a circular plate shape that may have a size relatively greater than that of the first sound generation device 1600, and may have a particular thickness. The heat dissipation member may be disposed on a whole rear surface of the display panel 100. The heat dissipation member may be configured with a heat dissipation tape or a heat dissipation sheet which is formed of a metal material, having a high thermal conductivity, such as aluminum (Al), copper (Cu), silver (Ag), or an alloy thereof. Embodiments are not limited to these example materials.

Figure 10:
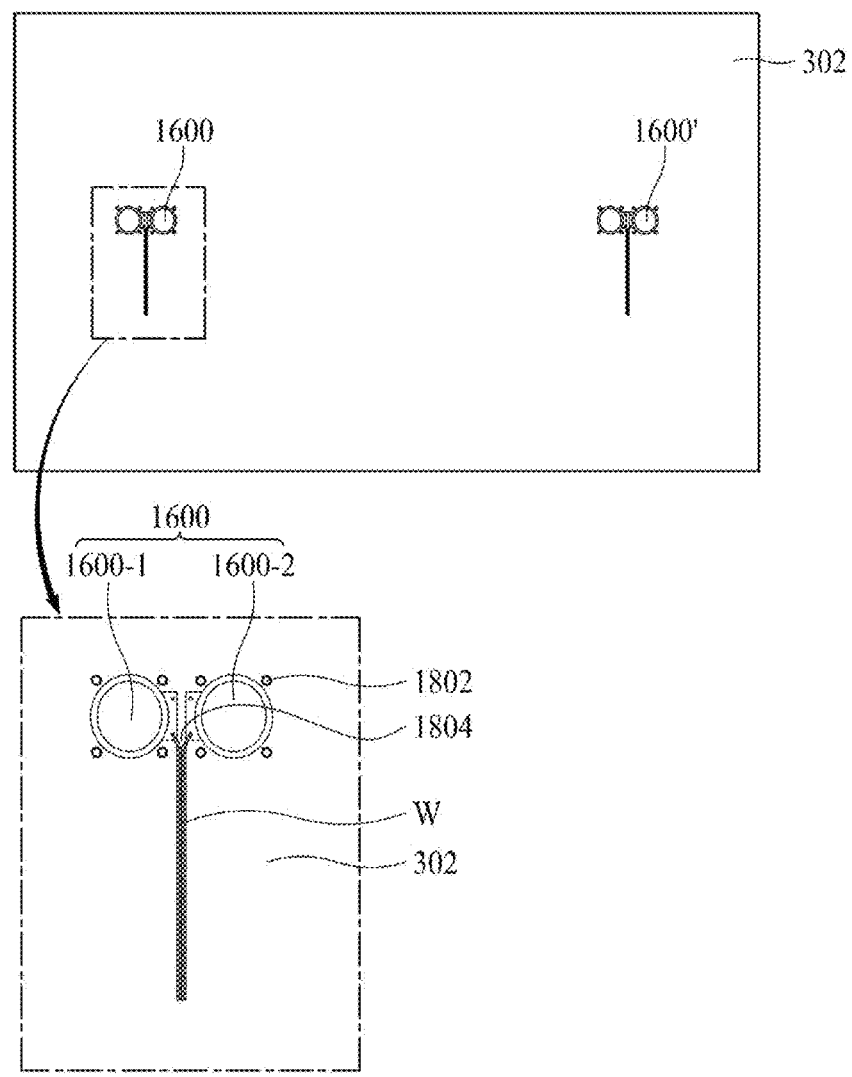
FIG. 10 illustrates a front view of a supporting member according to an example embodiment of the present disclosure.

FIG. 10 illustrates a front view of a supporting member according to an example embodiment of the present disclosure.

With reference to FIG. 10, a first sound generation device 1600 and a second sound generation device 1600' may be disposed on a second supporting member 302. To describe the first sound generation device 1600 for example, a groove G may be provided in a second supporting member 302. The groove G may be provided between two sound generation devices 1600-1 and 1600-2 of the first sound generation device 1600, and a wiring W for applying a signal to the first sound generation device 1600 may be accommodated into the groove G. In the second sound generation device 1600', a wiring W for applying a signal to the second sound generation device 1600' may be accommodated into the groove G of the second supporting member 302.

Figure 11:
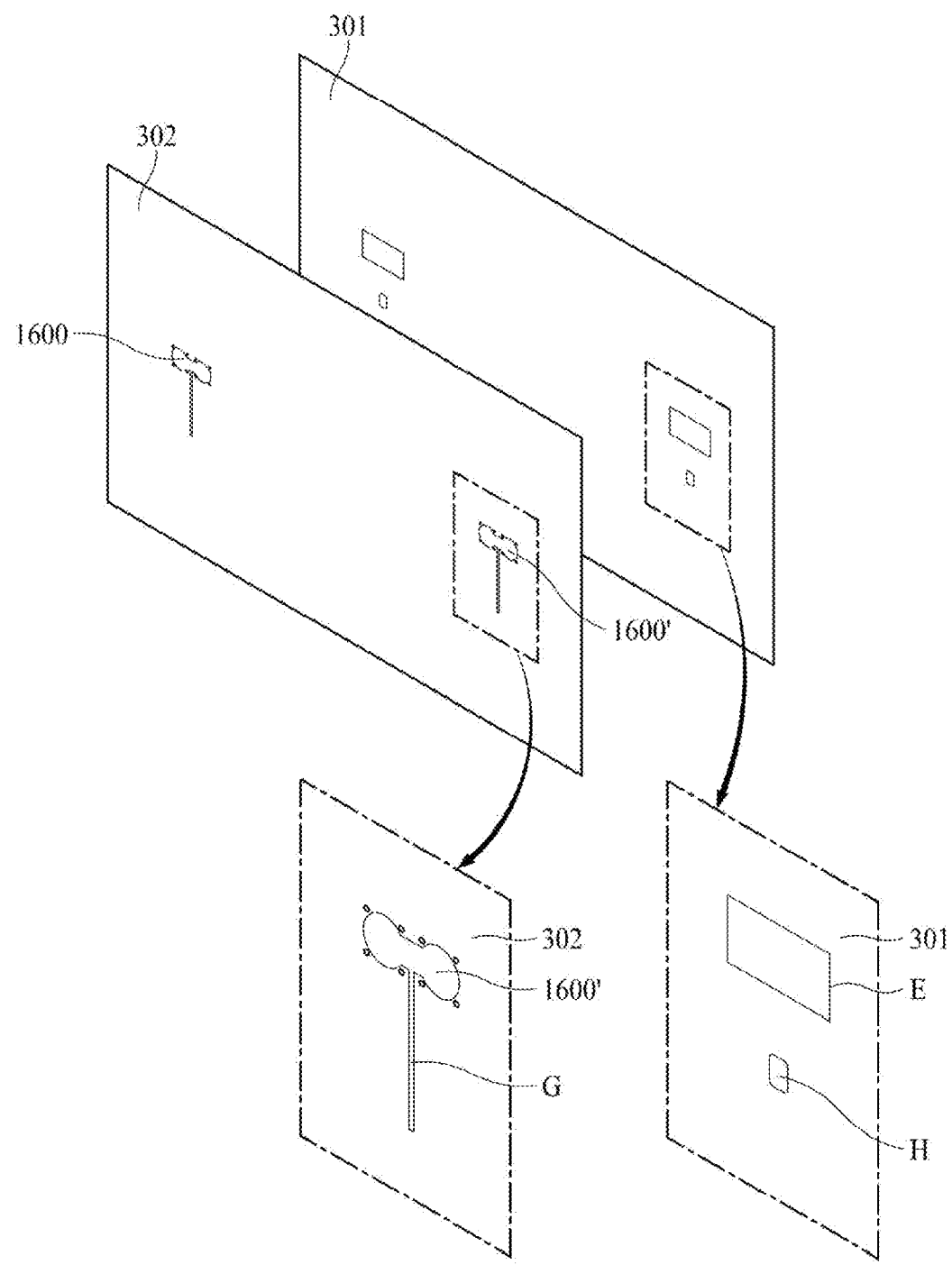
FIG. 11 is an exploded perspective view of a supporting member according to an example embodiment of the present disclosure.

FIG. 11 is an exploded perspective view of a supporting member according to an example embodiment of the present disclosure.

With reference to FIG. 11, a wiring accommodated into a groove G in a second supporting member 302 and a hole H of a first supporting member 301 are illustrated. A first sound generation device 1600 and a second sound generation device 1600' may be disposed in the first supporting member 301 and the second supporting member 302. Hereinafter the second sound generation device 1600' will be described as an example.

The groove G may be provided between a 2-1$^{st}$ sound generation device 1600'-1 and a 2-2$^{nd}$ sound generation device 1600'-2, and a wiring for applying a signal to the second sound generation device 1600' may be accommodated into the groove G. The reference label "E" refers to a portion where the second sound generation device 1600' may be disposed. As in the second sound generation device 1600', a groove G may also be provided in the first sound generation device 1600, and a wiring for applying a signal to the first sound generation device 1600 may be accommodated into the groove G.

The wiring accommodated into the groove G may extend to a rear surface, which may be an exposed portion of the first supporting member 301, through the hole H of the first supporting member 301. The extended wiring may be connected to a driving circuit unit, and the wiring and the driving circuit unit may be covered by a rear cover. Accordingly, a wiring for applying a signal to a sound generation device may be provided to extend to a rear surface of a supporting member, and the wiring extending to the rear surface of the supporting member may be covered by the rear cover, thereby enhancing a good design in appearance.

Figure 12:
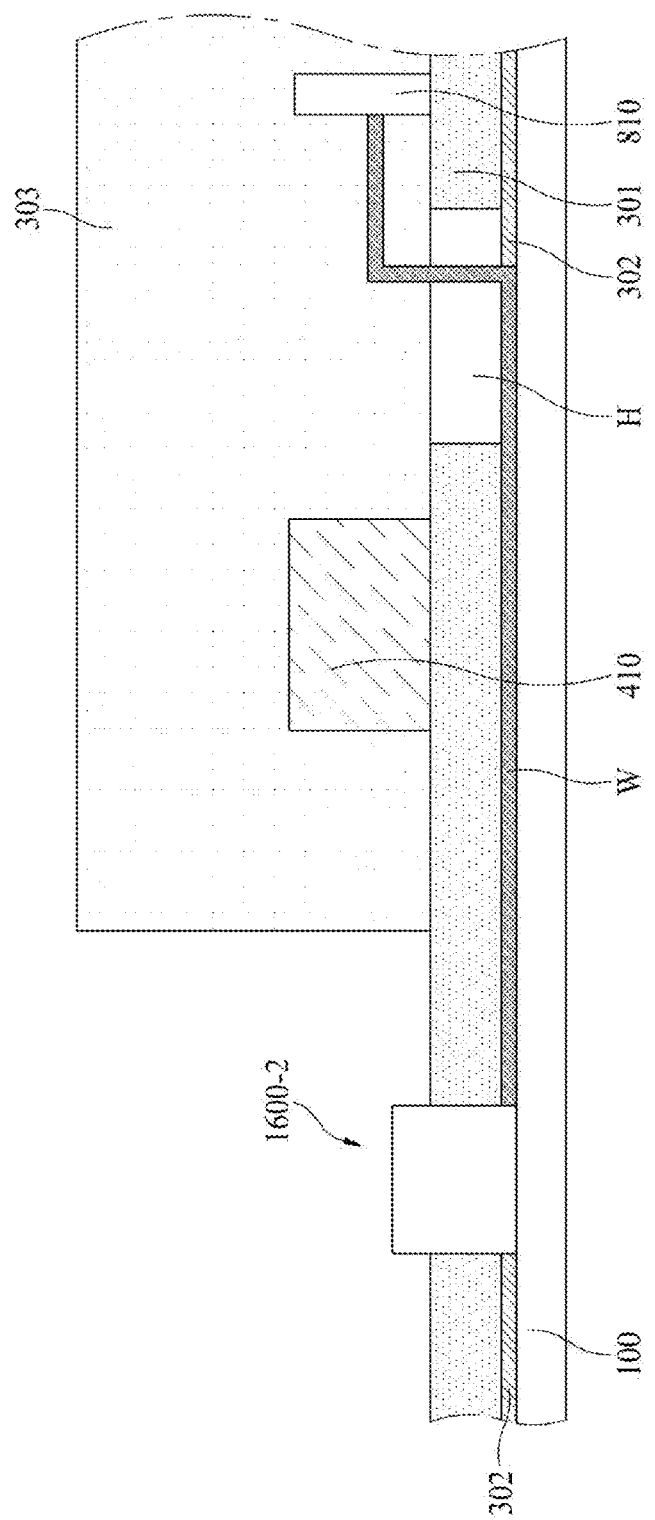
FIG. 12 is a side view according to an example embodiment of the present disclosure.

FIG. 12 is a side view according to an example embodiment of the present disclosure.

With reference to FIG. 12, a second supporting member 302 and a first supporting member 301 may be disposed on a rear surface of a display panel 100. Also, a rear cover 303 may be disposed on a rear surface of the first supporting member 301.

A sound generation device 1600-2 may be disposed on a rear surface of the display panel 100. A wiring W for applying a signal to the sound generation device 1600-2 may be disposed under a rigid bar 410. The first supporting member 301 may include a hole H that may allow the wiring W to extend to a rear surface of the first supporting member 301. The wiring W may be connected to a driving circuit unit 810. The hole H and the wiring W may be disposed under the rigid bar 410. Also, the hole H, the wiring W, and the driving circuit unit 810 may be covered by the rear cover 303. Therefore, a portion of a wiring exposed at a rear surface of a supporting member may be covered by the rear cover 303, thereby solving a problem of a final product having visible wiring. When the portion of the wiring exposed at the rear surface of the supporting member is covered by the rear cover 303, a display apparatus including a supporting member having a hidden wire structure may be provided. Accordingly, a display apparatus having a clean design may be provided based on the hidden wire structure.

In the FIG. 12 example, the wiring W is illustrated as being provided on the display panel 100, but embodiments are not limited thereto. For example, the wiring W may pass through a space between the first supporting member 301 and a partition, which may be a space or an air gap where a sound is generated when the display panel 100 vibrates. The wiring W may extend to the rear surface of the first supporting member 301, and may be covered by the rear cover 303.

Figure 13A:
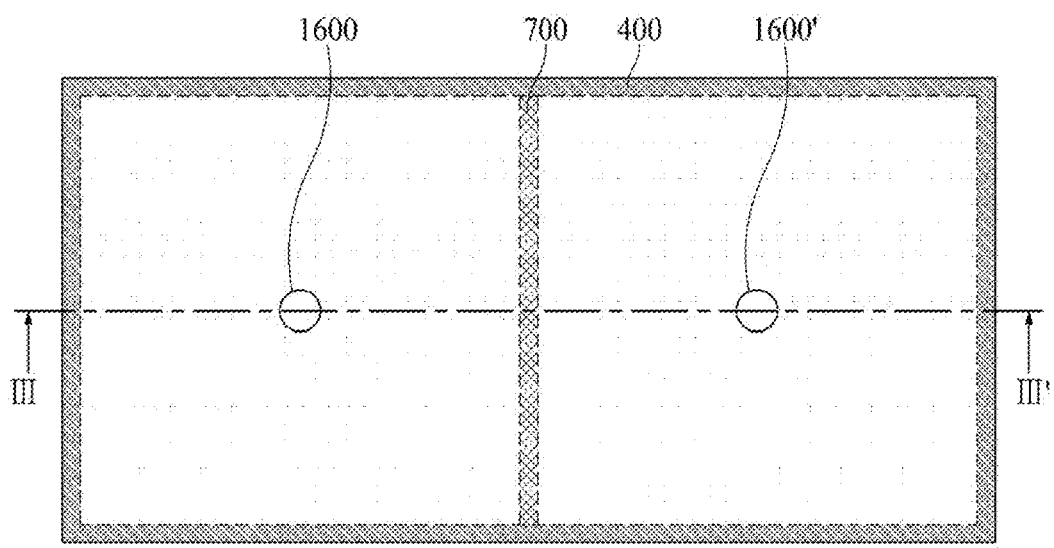
FIGS. 13A to 13C illustrate an example embodiment of a sound generation device and a partition in a display apparatus according to an example embodiment of the present disclosure.
Figure 13B:
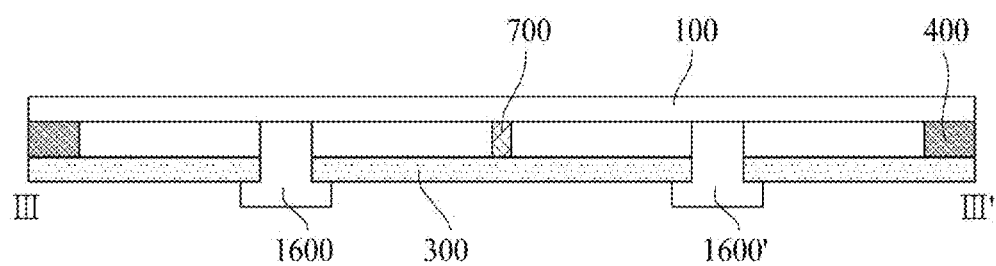
Figure 13C:
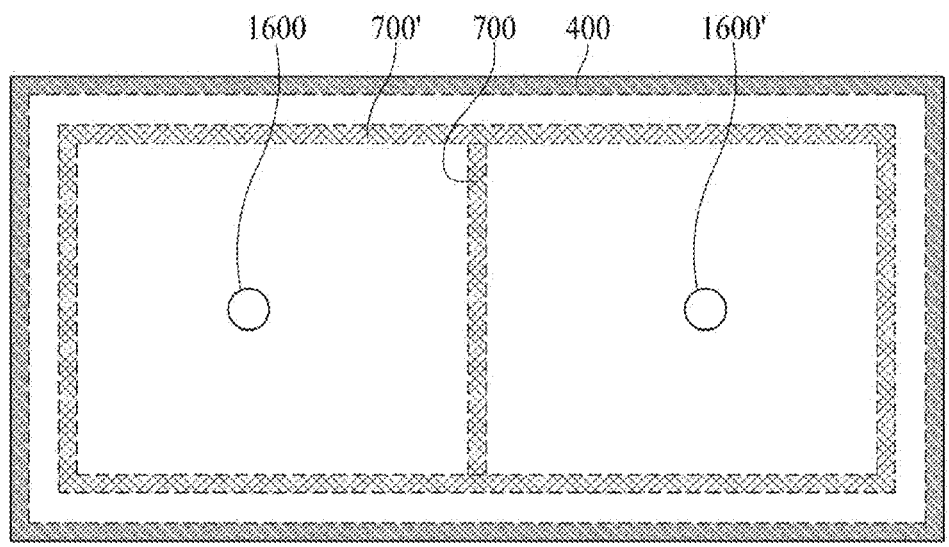

FIGS. 13A to 13C illustrate an example embodiment of a sound generation device and a partition in a display apparatus according to an example embodiment of the present disclosure.

With reference to FIG. 13A, a display panel 100 may display an image, and may include a first region and a second region. The first region may be a left region of the display panel 100, and the second region may be a right region of the display panel 100. A first sound generation device 1600 may be disposed in the first region of the display panel 100, and a second sound generation device 1600' may be disposed in the second region of the display panel 100. The first sound generation device 1600 and the second sound generation device 1600' may output sounds having a middle-high-pitched sound band, and may output a stereo sound through left-right sound separation.

A partition 700 may be disposed between the first sound generation device 1600 and the second sound generation device 1600'. The partition 700 may be a space or an air gap where a sound is generated when the display panel 100 is vibrated by the sound generation device. An air gap or a space that generates or transfers sound may be referred to as a partition, or may be referred to as an enclosure or a baffle, but the term is not limited thereto. The partition 700 may be a whole region of four outer sides of the display panel 100 or a supporting member. The partition 700 may be provided in a sealed structure, or may be provided in an unsealed structure.

The partition 700 may respectively separate left sound and right sound generated by the first sound generation device 1600 and the second sound generation device 1600'. A vibration of the display panel 100 performed in a space or an air gap defined as the partition 700 may be attenuated or absorbed by a center of the display panel 100. Thus, sound in the left region may not be transferred to a space of the right region. Therefore, when the partition 700 is provided, the left sound and the right sound may be separated from each other. Thus, a sound output characteristic may be enhanced.

The first sound generation device 1600 and the second sound generation device 1600' may output sound having a middle-high-pitched sound band. Here, a middle sound band may be sound of about 200 Hz to 3 kHz, and a high-pitched sound band may be sound of about 3 kHz or more. However, embodiments are not limited thereto.

The partition 700 may be formed of polyurethane, polyolefin, and/or the like, but embodiments are not limited thereto. For example, the partition 700 may be formed of a single-sided tape, a double-sided tape, and/or the like. For example, the partition 700 may be formed of a material with elasticity, which is capable of being compressed to some extent.

Therefore, the middle-high-pitched sound may be output by two sound generation devices. Also, when a partition is provided between two sound generation devices, a left sound and a right sound may be separated from each other, thereby enhancing a stereo characteristic of a sound.

FIG. 13B is a cross-sectional view taken along line of FIG. 13A. With reference to FIG. 13B, the display apparatus may include the first and second sound generation devices 1600 and 1600', the partition 700, and the supporting member 300. The partition 700 may be between the display panel 1000 and the supporting member 300. The supporting member 300 may support one or more of a rear surface and a side surface of the display panel 100. The first and second sound generation devices 1600 and 1600' may be fixed to the supporting member 300. Description given above with reference to FIG. 9 may be applied to a connection structure of the first and second sound generation devices 1600 and 1600' to the supporting member 300. For example, a connection structure of two sound generation devices and a supporting member has been described above with reference to FIG. 9, and may be similarly applied to one sound generation device of FIGS. 13A to 13C.

An adhesive member 400 may be disposed in a periphery of each of the display panel 100 and the supporting member 300, and may attach the display panel 100 on the supporting member 300. The adhesive member 400 may include a double-sided tape, but embodiments are not limited thereto.

FIG. 13C illustrates another example embodiment of a sound generation device and a partition. With reference to FIG. 13C, a partition 700 for separating a left sound and a right sound generated by a first sound generation device 1600 and a second sound generation device 1600' may be provided. A second partition 700' may be further provided along four outer sides of a display panel 100. The second partition 700' may reduce or prevent sound from being leaked to the outside through each of side surfaces of the display panel 100. Thus, the second partition 700' may allow the sound to be output to only a region in front of the display panel 100, thereby enhancing a sound output characteristic.

If an adhesive member 400 is configured with a foam pad, the adhesive member 400 may act as the second partition 700'. In this case, the second partition 700' may not be provided.

FIGS. 14A to 14K illustrate another example embodiment of a sound generation device and a partition in a display apparatus according to an example embodiment of the present disclosure.

As illustrated in FIGS. 14A to 14K, a partition having a double structure including two or more partitions may be provided between a left region and a right region. The left and right regions of a display panel may have the same vibration characteristic when realizing a mono sound in which the left and right regions output the same sound. As such, a resonance phenomenon or an interference phenomenon may be increased or maximized in a certain frequency band, causing the reduction in sound pressure level. Therefore, the partition may be configured in a structure including two or more partitions, for decreasing an influence of a sound characteristic caused by a resonance frequency difference of a middle-high-pitched sound that may occur in a first sound generation device provided in a first region (e.g., the left region) and a second sound generation device provided in a second region (e.g., the right region). In FIGS. 14A to 14K, the partition having the double structure or the dual stricter is illustrated, but three or more partitions may be provided. When three or more partitions are provided, a sound pressure level may be prevented from being reduced even when sound interference in the left and right regions increases, thereby avoiding or preventing a sound output characteristic from being discontinuously recognized.

The first sound generation device and the second sound generation device may output different sounds having the middle-high-pitched sound band, and a stereo sound may be output through left-right sound separation. Alternatively, the first sound generation device may be provided in the first region, e.g., the left region, the second sound generation device may be provided in the second region, e.g., the right region, and a sound generation device may not be provided in a third region, e.g., a central region. Accordingly, a sound characteristic corresponding to the middle-high-pitched sound band in the left region and the right region may be further enhanced.

With reference to FIGS. 14A to 14K, a display panel 100 may display an image, and may include a first region, a second region, and a third region. One or more sound generation devices or a pair of sound generation devices may be disposed in each of the first region and the second region of the display panel 100.

Figure 14A:
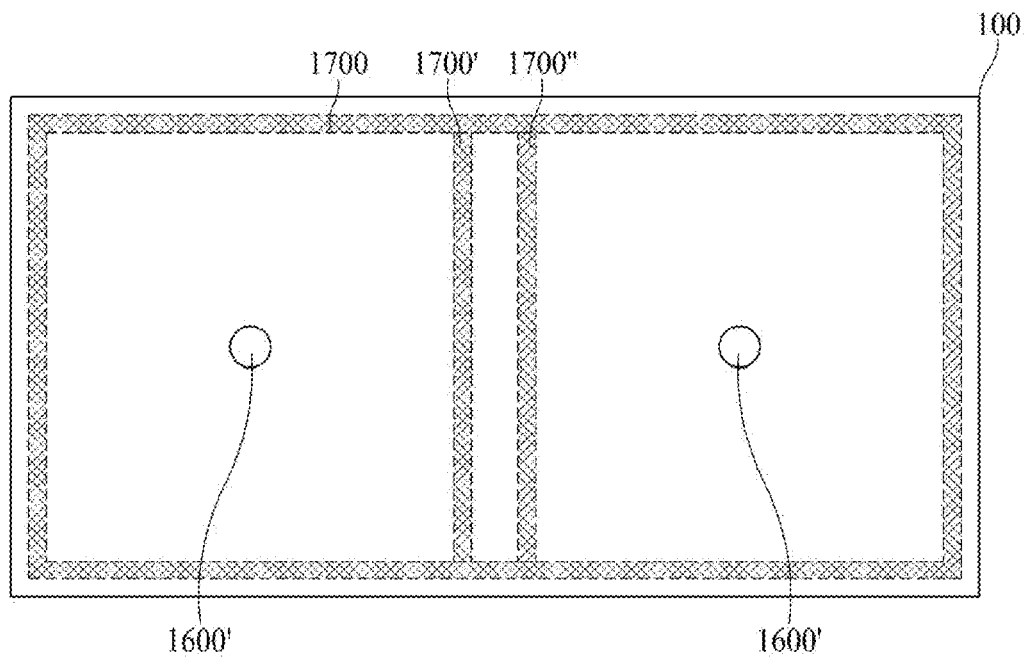
FIGS. 14A to 14K illustrate another example embodiment of a sound generation device and a partition in a display apparatus according to an example embodiment of the present disclosure.

With reference to FIG. 14A, a first sound generation device 1600 may be disposed in a first region which is a left region of a display panel 100, and a second sound generation device 1600' may be disposed in a second region which is a right region of the display panel 100. At least two partitions (for example, a first partition 1700' and a second partition 1700") may be disposed between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be disposed in a periphery of the display panel 100 or the supporting member. Therefore, at least two partitions may be provided in a center region of the display panel 100, thereby decreasing an influence of a sound characteristic caused by a resonance frequency difference of a middle-high-pitched sound that may occur in the left region and the right region of the display panel 100.

Figure 14B:
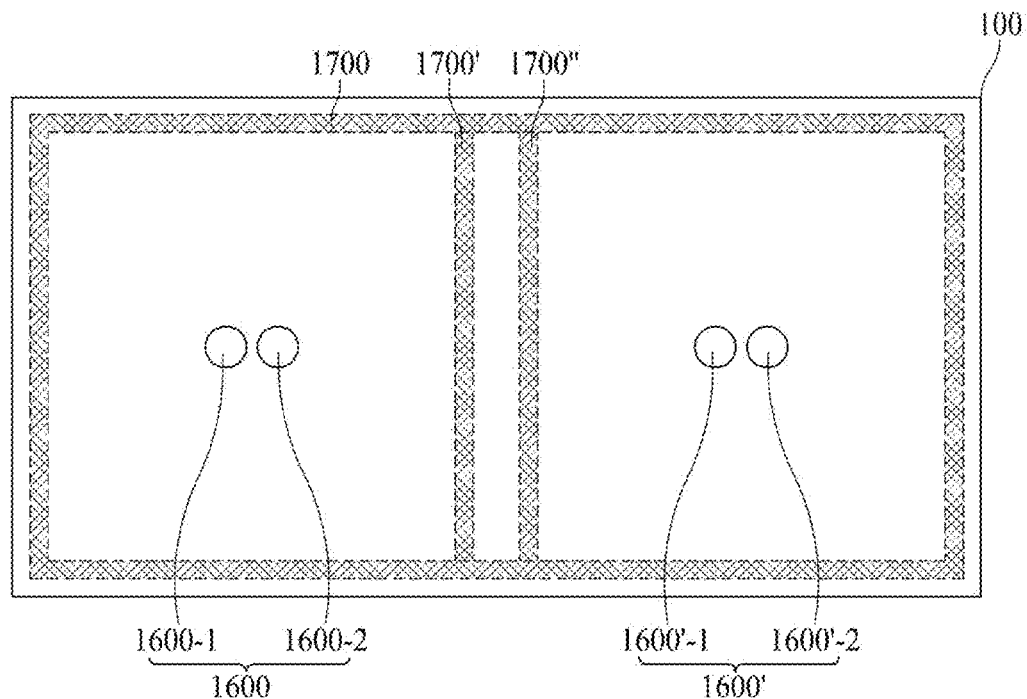

With reference to FIG. 14B, a first sound generation device 1600, including two sound generation device 1600-1 and 1600-2, may be disposed in a first region which is a left region of a display panel 100. A second sound generation device 1600', including two sound generation device 1600'-1 and 1600'-2, may be disposed in a second region which is a right region of the display panel 100. At least two partitions (for example, a first partition 1700' and a second partition 1700") may be disposed between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be disposed in a periphery of the display panel 100. Therefore, at least two partitions may be provided in a central region of the display panel 100, thereby decreasing an influence of a sound characteristic caused by a resonance frequency difference of a middle-high-pitched sound that may occur in the left region and the right region of the display panel 100.

When the first and second sound generation devices 1600 and 1600' each including two sound generation devices are provided, a signal or a current applied to a sound generation device may be divided into two signals or two currents, thereby reducing the occurrence of heat caused by vibration of the sound generation device. Therefore, the occurrence of heat may be reduced, and thus, reliability may be enhanced. Also, when the first and second sound generation devices 1600 and 1600', each including two sound generation devices, are provided, a sound output characteristic may be doubly improved, thereby enhancing a sound pressure level. When the first and second sound generation devices 1600 and 1600' each including two sound generation devices are provided in at least two of the first region, the second region, and the third region, two sub-sound generation devices, corresponding to each of the first to third regions, may output sounds having the same sound band, thereby increasing a sound pressure level.

Figure 14C:
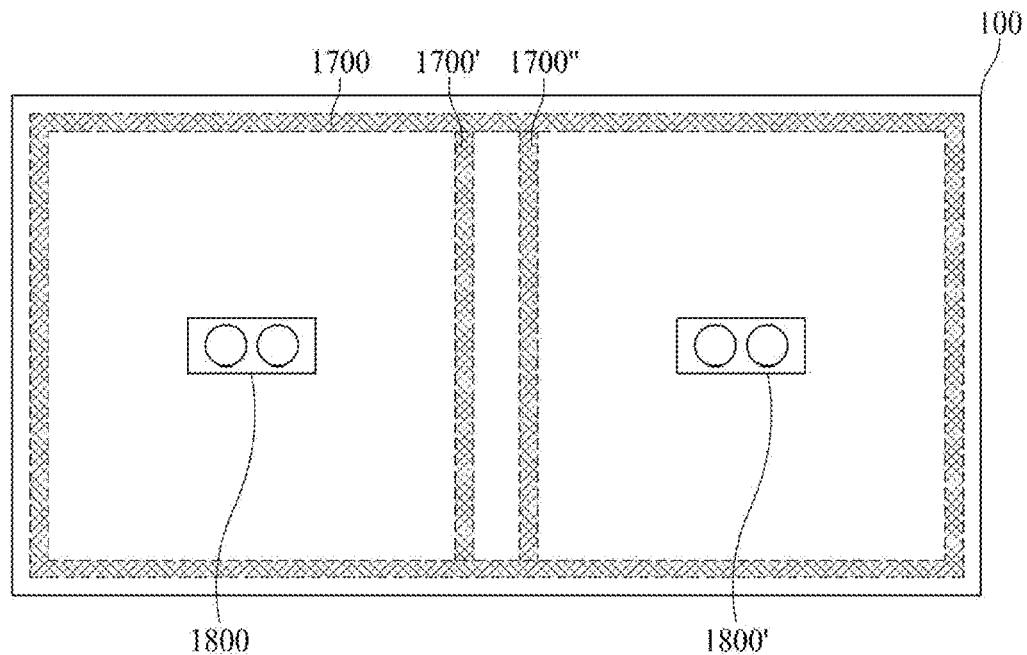

With reference to FIG. 14C, a pair of first sound generation device 1800 may be disposed in a first region, e.g., a left region, of a display panel 100. A pair of second sound generation devices 1800' may be disposed in a second region, e.g., a right region, of the display panel 100. When a pair of sound generation devices is provided in each of the first region and the second region, delay or interference between sound waves generated by the sound generation devices may be reduced, thereby enhancing a sound output characteristic. At least two partitions (for example, a first partition 1700' and a second partition 1700") may be disposed between the first sound generation device 1800 and the second sound generation device 1800'. Alternatively, the first partition 1700' may be configured with two or more sub-partitions between the first sound generation device 1800 and the second sound generation device 1800'. Also, a third partition 1700 may be disposed in a periphery of the display panel 100. Therefore, at least two partitions may be provided in a center region of the display panel 100, thereby decreasing an influence of a sound characteristic caused by a resonance frequency difference of a middle-high-pitched sound that may occur in the left region and the right region of the display panel 100.

A sound wave, generated when a display panel vibrates by a sound generation device, may radially progress from a center of the sound generation device and may travel. The sound wave may be referred to as a "progressive wave." The progressive wave may be reflected by one side of a partition to generate a reflected wave, and the reflected wave may travel in a direction opposite to the progressive wave. The reflected wave overlaps and interferes in the progressive wave, and does not travel, thereby generating a standing wave that stands at a certain position. A sound pressure level is reduced by the standing wave, thus, a sound output characteristic is reduced. Therefore, a bent part may be provided in the partition to decrease the degree of reduction in sound pressure level caused by the standing wave generated by interference between the reflected wave and the progressive wave. Also, the standing wave that causes the sound pressure level to be reduced may be greatly generated at a position at which a level of each of the progressive wave and the reflected wave is high. Accordingly, the bent part may be disposed at a position at which a level of a sound wave transferred from the sound generation device is highest. This will be described below with reference to FIGS. 14D to 14K.

With reference to FIGS. 14D to 14K, a partition having a double structure including two or more partitions may be provided. A bent part may be further provided on at least one side of the partition.

Figure 14D:
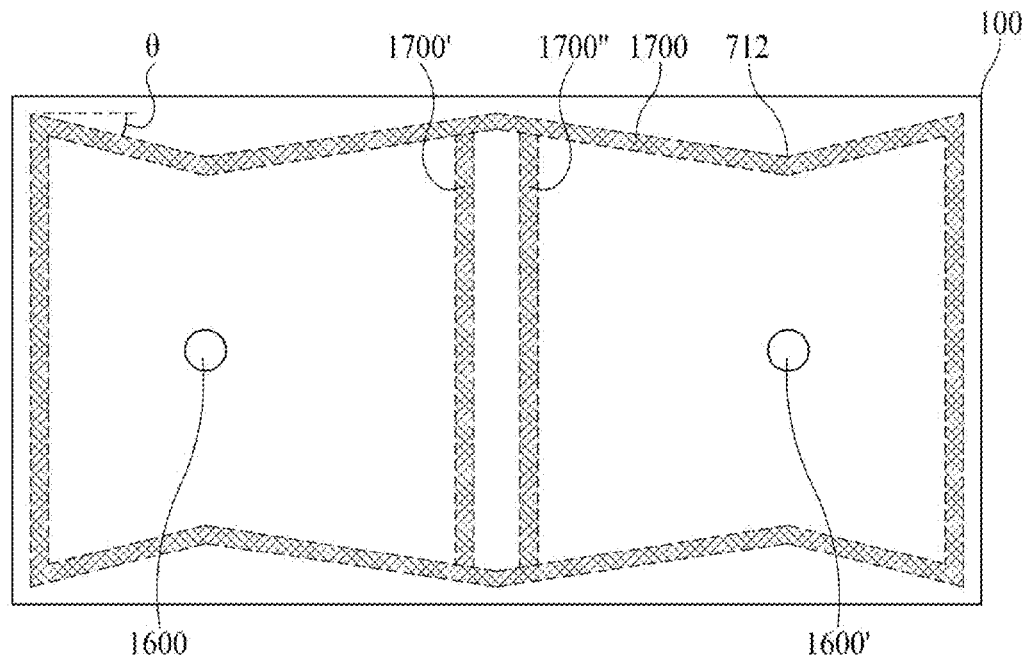
Figure 14E:
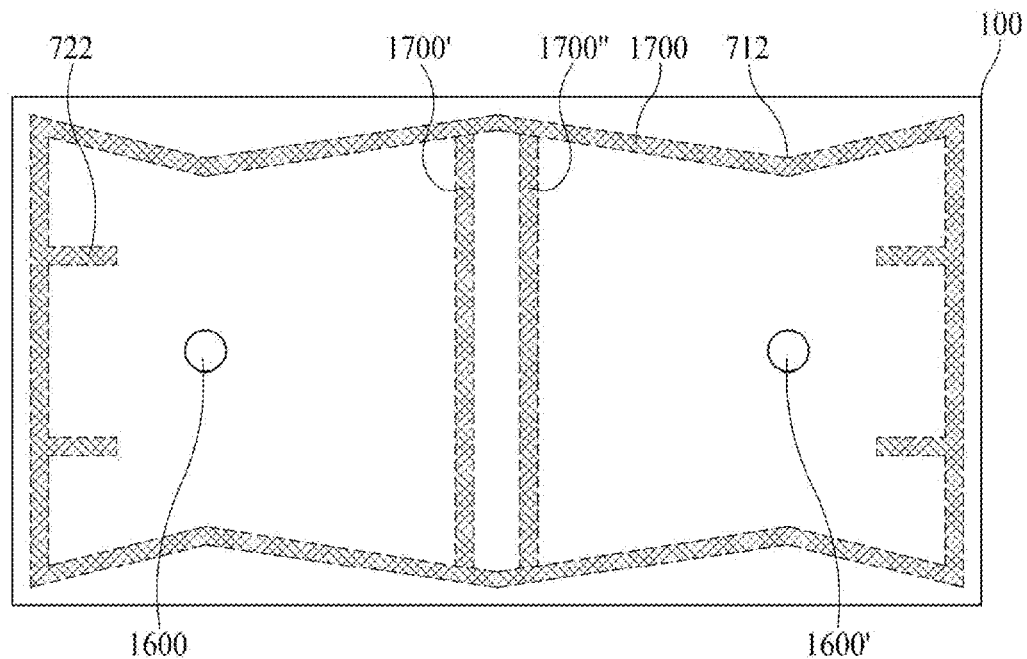

With reference to FIGS. 14D and 14E, a first sound generation device 1600 may be disposed in a first region, e.g., a left region, of a display panel 100, and a second sound generation device 1600' may be disposed in a second region, e.g., a right region, of the display panel 100. At least two partitions (for example, a first partition 1700' and a second partition 1700") may be disposed between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be disposed in a periphery of the display panel 100. A bent part 712 may be provided on one or more sides of the third partition 1700.

The bent part 712 may be provided on one or more sides, where a strongest sound wave may reach, of four sides of the first partition 1700, and may extend toward a direction of the first and second sound generation devices 1600 and 1600'. The bent part 712 may extend toward a center of each of the first and second sound generation devices 1600 and 1600'. Accordingly, the degree of reduction in a sound pressure level caused by a standing wave may be reduced.

The display panel 100 may include four sides, and the bent part 712 may be provided on one or more first sides of the four sides. A bent part may be provided on each of two sides (for example, an upper side and a lower side) of the four sides surrounding the display panel 100 to have a particular inclined angle with respect to a horizontal direction (or a widthwise direction) of the display panel 100. The bent part 712 may be configured with two rectilinear parts or two straight lines, and may be provided at a position at which the two rectilinear parts contact or meet each other. The bent part 712 may be provided in a rectilinear shape, a straight line shape, a curve shape, a round shape, or the like, but a shape of the bent part 712 is not limited to these examples.

An inclined angle "θ" of the bent part 712 may vary based on a degree to which restriction of the standing wave is desired, and may be adjusted within a range from about 10° (degrees) to 30° (degrees). For example, if a sound output region is for the low-pitched sound band or an output of a sound generation device is large, the inclined angle of the bent part 712 may be set to be a large angle. Alternatively, if the sound output region is for the high-pitched sound band or the output of the sound generation device is small, the inclined angle of the bent part 712 may be set to a be small angle. Here, the inclined angle of the bent part 712 may be an angle at which one side of the third partition 1700 is inclined with respect to a horizontal direction (or a widthwise direction) of the display panel 100. Also, the horizontal direction (or the widthwise direction) may correspond to a direction of a long side of a display apparatus, and a vertical direction (or a lengthwise direction) may correspond to a direction of a short side of the display apparatus.

The third partition 1700 may be provided between the first partition 1700' and the second partition 1700". The third partition 1700 may have a bent shape between the first partition 1700' and the second partition 1700". The bent shape of the third partition 1700 may be provided to face (or bend toward) the display panel 100. The third partition 1700 may be provided in a bent shape, a rectilinear shape, a straight line shape, a curve shape, or a round shape between the first partition 1700' and the second partition 1700", but a shape of the third partition 1700 is not limited to these examples.

With reference to FIG. 14E, the bent part 712 and a protrusion portion 722 may be provided. For example, the bent part 712 may be provided on one or more sides of the third partition 1700, and one or more protrusion portions 722 may be provided on a side vertical or perpendicular to a side on which the bent part 712 is provided. A protrusion portion 722 disposed in the left region of the display panel 100 may extend toward the first sound generation device 1600. A protrusion portion 722 disposed in the right region of the display panel 100 may extend toward the second sound generation device 1600'.

The protrusion portion 722 may trap a reflected wave, thereby decreasing the degree of reduction in a sound pressure level caused by the standing wave. The protrusion portion 722 may be provided as one or in a plurality on one or more sides of the third partition 1700, and the one or more protrusion portions 722 may be symmetrically disposed with respect to the sound generation device. In the FIG. 14E example, one or more protrusion portions 722 may be provided on a second side vertical or perpendicular to a first side of four sides of the display panel 100.

Figure 14F:
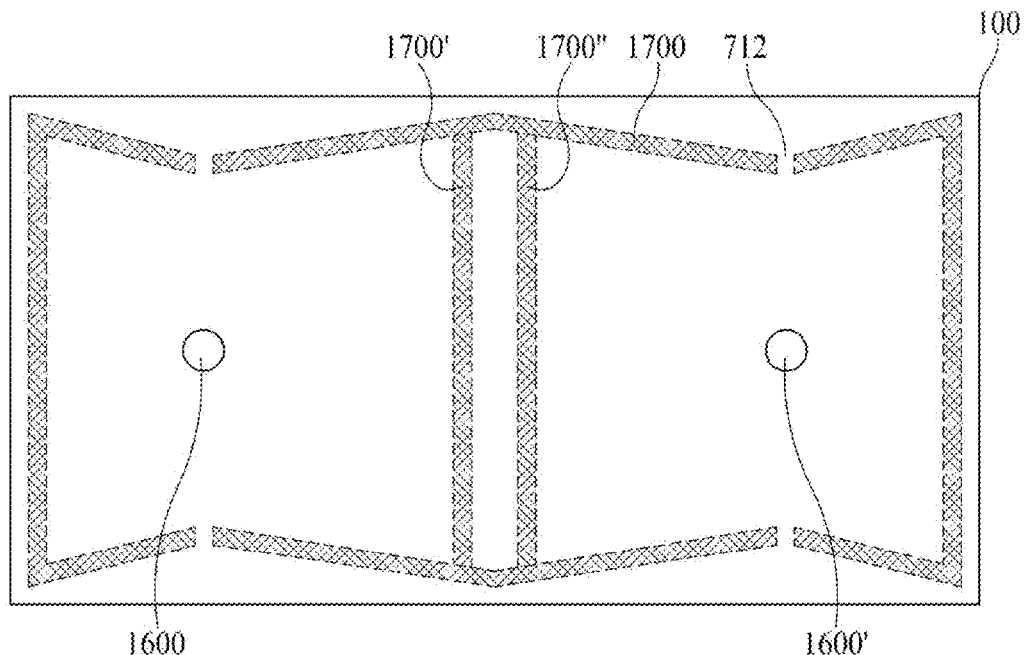
Figure 14G:
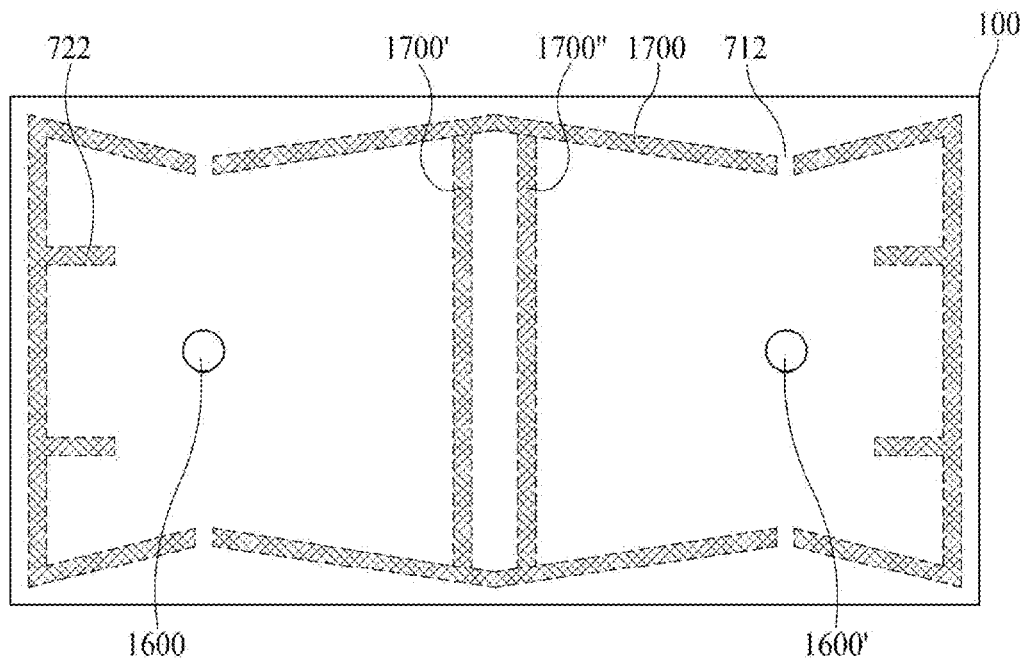

As illustrated in the examples of FIGS. 14D and 14E, the third partition 1700 may be provided in a sealed structure. Also, as illustrated in the examples of FIGS. 14F and 14G, the third partition 1700 may be provided in an unsealed structure. For example, the third partition 1700 may be provided in a zigzag structure and the sealed structure. Alternatively, the third partition 1700 may be provided in the zigzag structure and the unsealed structure. Alternatively, the bent part 712 may be provided in the sealed structure, and a portion of the bent part 712 between the first partition 1700' and the second partition 1700" may be provided in the unsealed structure. If the third partition 1700 is provided in the unsealed structure, the cost of materials of the third partition 1700 may be reduced in comparison with the sealed structure. Also, the inventors have confirmed that a sound characteristic difference does not occur between a case in which the third partition 1700 is provided in the unsealed structure and a case in which the third partition 1700 is provided in the sealed structure.

With reference to FIGS. 14F and 14G, a first sound generation device 1600 may be disposed in a first region, e.g., a left region of a display panel 100, and a second sound generation device 1600' may be disposed in a second region, e.g., a right region, of the display panel 100. A first partition 1700' and a second partition 1700" may be disposed between the first sound generation device 1600 and the second sound generation device 1600', and a third partition 1700 may be disposed in a periphery of the display panel 100. The first partition 1700' may be configured with two or more sub-partitions between the first sound generation device 1600 and the second sound generation device 1600'. A bent part 712 may be provided on one or more sides of the third partition 1700. The bent part 712 may bend toward a central direction of the first sound generation device 1600 and a central direction of the second sound generation device 1600'. The third partition 1700 may be provided in the unsealed structure. For example, the third partition 1700 may be provided in the zigzag structure and the unsealed structure. Alternatively, the third partition 1700 may be provided in the unsealed structure, and a portion of the bent part 712 between the first partition 1700' and the second partition 1700" may be provided in the sealed structure.

In FIG. 14G, an example in which a protrusion portion 722 is further provided is illustrated. A description of the protrusion portion 722 is substantially similar to the description given above with reference to FIG. 14E, and is not repeated.

Figure 14H:
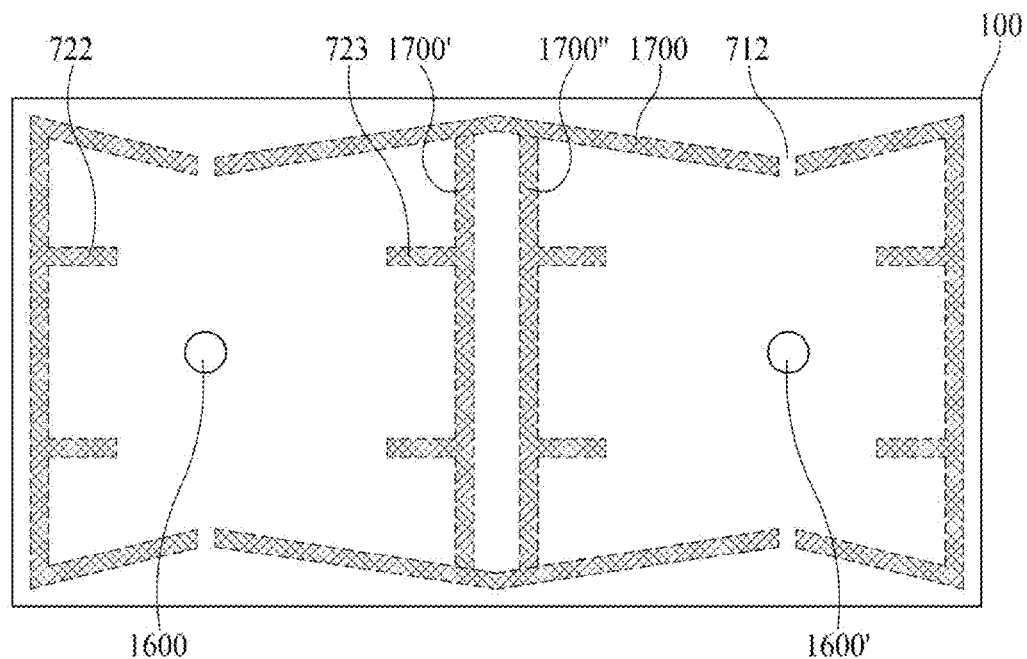
Figure 14I:
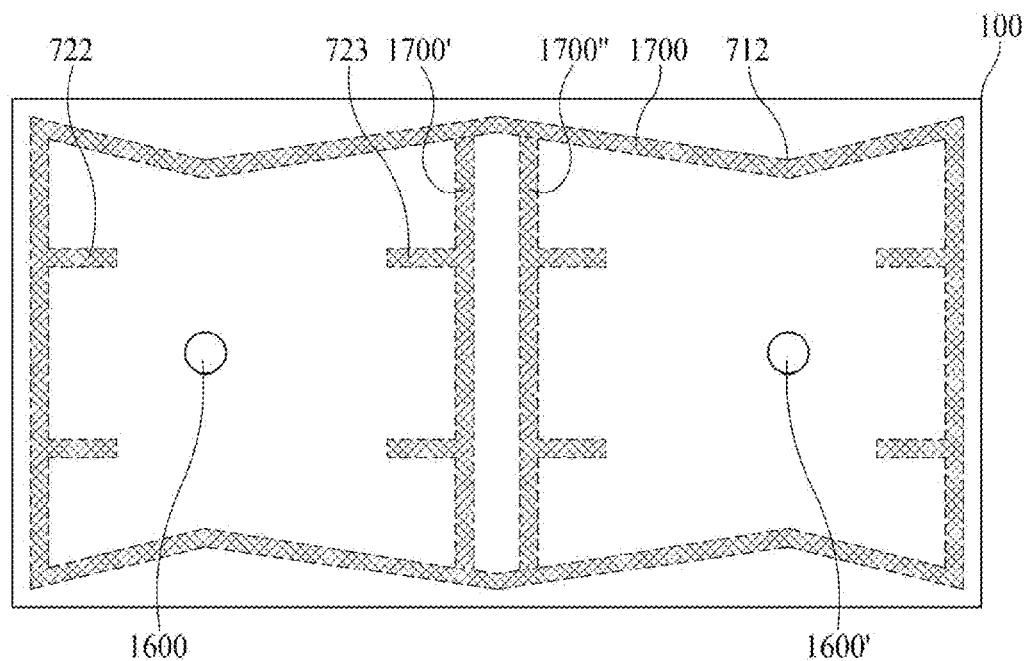

In the examples of FIGS. 14H and 14I, each of a protrusion portion 722 and a second protrusion portion 723 may be provided as one or in a plurality on a second side vertical to a first side of four sides of the display panel 100. A protrusion portion 722 and a second protrusion portion 723, provided in a left region of a display panel 100, may extend toward a first sound generation device 1600. A protrusion portion 722 and a second protrusion portion 723 provided in a right region of the display panel 100 may extend toward a second sound generation device 1600'. Therefore, when the protrusion portion 722 and the second protrusion portion 723 are provided, the protrusion portion 722 and the second protrusion portion 723 may trap a reflected wave, thereby decreasing the degree of reduction in a sound pressure level caused by the standing wave.

In FIG. 14H, a third partition 1700 may be provided in the sealed structure. In FIG. 14I, the third partition 1700 may be provided in the unsealed structure. A description of the third partition 1700 is substantially similar to the description given above with reference to FIGS. 14D to 14G, and is not repeated.

Figure 14J:
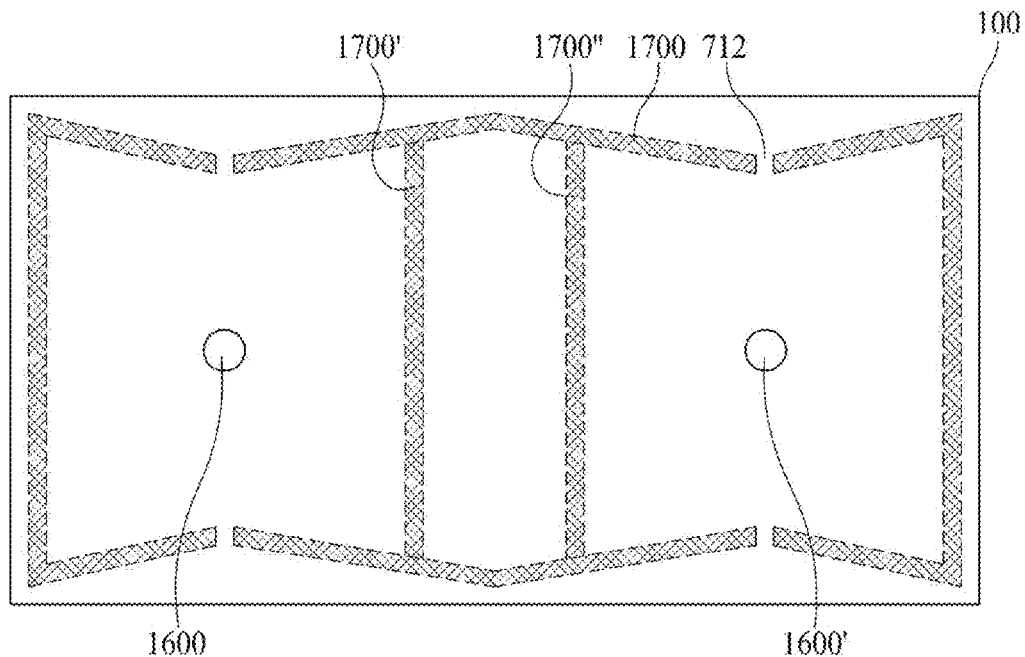
Figure 14K:
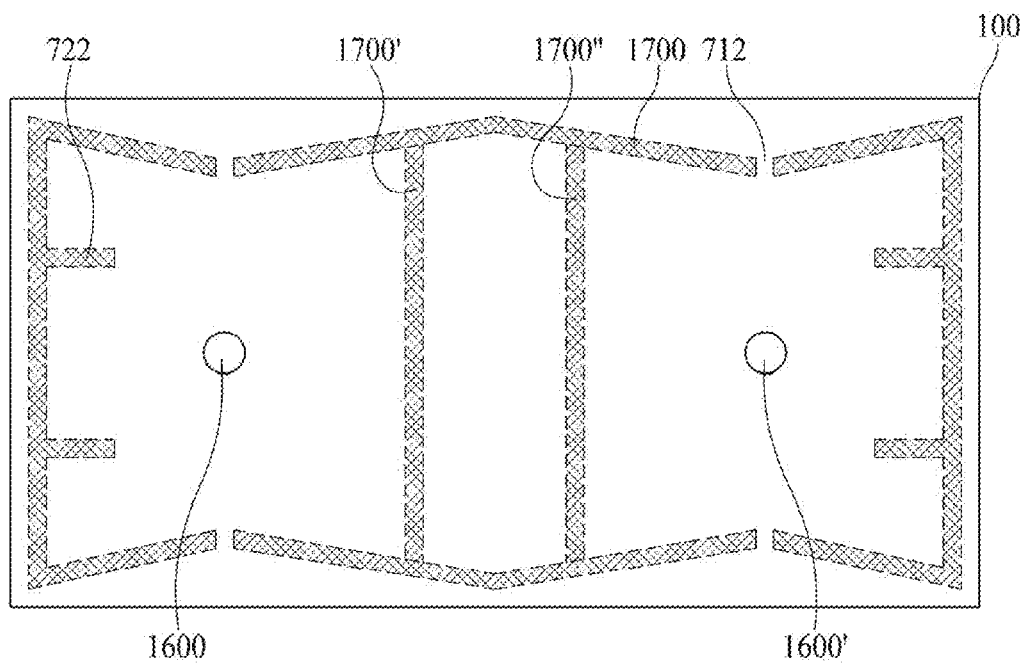

In FIGS. 14J and 14K, an interval or space between a first partition 1700' and a second partition 1700" may be set to be greater than an interval or space in FIGS. 14A to 14I. For example, a sound characteristic corresponding to the low-pitched sound band may be more enhanced than a case in which an area of a first region, an area of a second region, and an area of a third region are the same.

In FIG. 14K, an example in which a protrusion portion 722 is further provided is illustrated. A description of the protrusion portion 722 is substantially similar to the description given above with reference to FIG. 14E, and is not repeated. A structure of each of the sound generation device and the partition illustrated in FIGS. 14C to 14H may be similarly applied to the embodiment of FIGS. 14I and 14J.

In FIGS. 14D to 14K, examples in which one sound generation device is provided in each of the first region and the second region of the display panel 100 is illustrated, but embodiments are not limited thereto. For example, a pair of sound generation devices may be provided in each of the first region and the second region of the display panel 100, as illustrated in FIG. 14C. Also, in FIGS. 14D to 14K, a sound generation device including two sound generation devices may be provided in each of the first region and the second region of the display panel 100, as illustrated in FIG. 14B.

In FIGS. 14A to 14K, the display panel 100 may include three regions, and a sound generation device may not be disposed in the third region, e.g., a center region, of the display panel 100. An area of the third region may be set to be less than that of each of the first and second regions. In this case, sound quality corresponding to the low-pitched sound band may be enhanced. Also, an area of the first region, an area of the second region, and an area of the third region may be equally adjusted in order for a sound output characteristic corresponding to the middle-high-pitched sound band to almost similar to a sound output characteristic corresponding to the low-pitched sound band. Also, to enhance a sound output characteristic corresponding to the low-pitched sound band, an area of the third region may be set greater than that of each of the first and second regions.

In FIGS. 14J and 14K, the third partition 1700 may be provided in the unsealed structure, Alternatively, the third partition 1700 may be provided in the sealed structure.

FIGS. 14A to 14K illustrate examples in which a sound generation device is not disposed in a center of the left region, which is the first region of the display panel 100, or a center of the right region, which is the second region, Rather, in those examples, the sound generation device is disposed close to the left region or the right region. However, embodiments are not limited thereto. For example, the sound generation device may be disposed in the center of the left region, which is the first region of the display panel 100, or the center of the right region, which is the second region. Alternatively, the sound generation device may be asymmetrically disposed in the first region and the second region of the display panel 100. A stereo sound characteristic is more enhanced when the sound generation device is disposed close to the left region or the right region, as compared to a case in which the sound generation device is disposed in the center of the left region, which is the first region of the display panel 100, or the center of the right region, which is the second region. In FIGS. 14A to 14K, an adhesive member for attaching a display panel on a supporting member may be provided in a periphery of each of the display panel and the supporting member, as illustrated in the FIG. 13 example.

A sound output characteristic corresponding to a case in which a bent part is provided will be described below with reference to FIG. 15. Also, a sound output characteristic corresponding to a case in which a bent part and a protrusion portion are provided will be described below with reference to FIG. 16.

Figure 15:
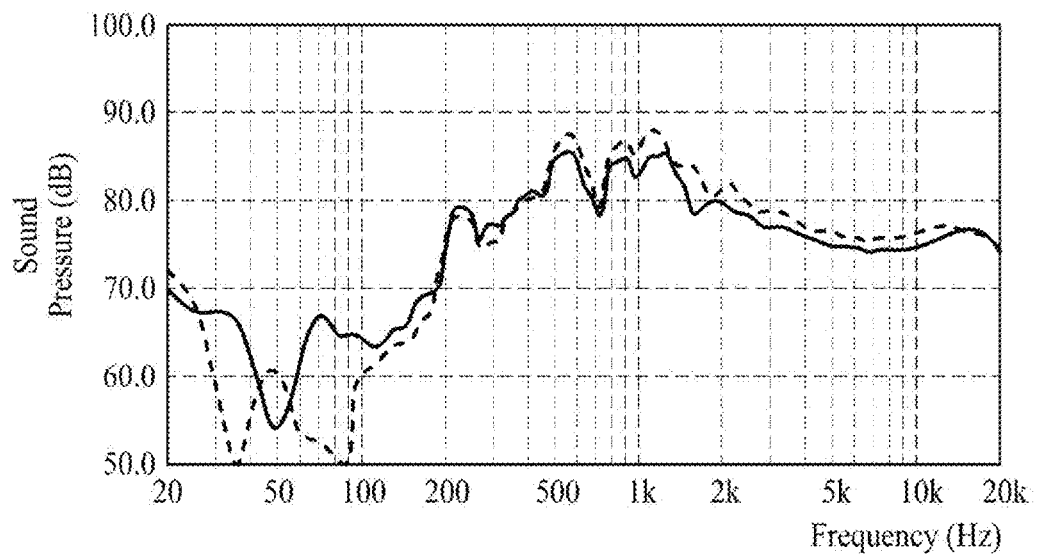
FIG. 15 is a diagram showing a sound output characteristic according to another example embodiment of a sound generation device and a partition in a display apparatus according to an example embodiment of the present disclosure.

FIG. 15 is a diagram showing a sound output characteristic according to another example embodiment of a sound generation device and a partition in a display apparatus according to an example embodiment of the present disclosure.

In FIG. 15, a dotted line shows a sound output characteristic of FIG. 14A, and a solid line shows a sound output characteristic of FIG. 14D. With reference to FIG. 15, it can be seen that in a frequency of about 200 Hz corresponding to the low-pitched sound band, a sound output characteristic is better when a bent part is provided, as compared to when the bent part is not provided.

Figure 16:
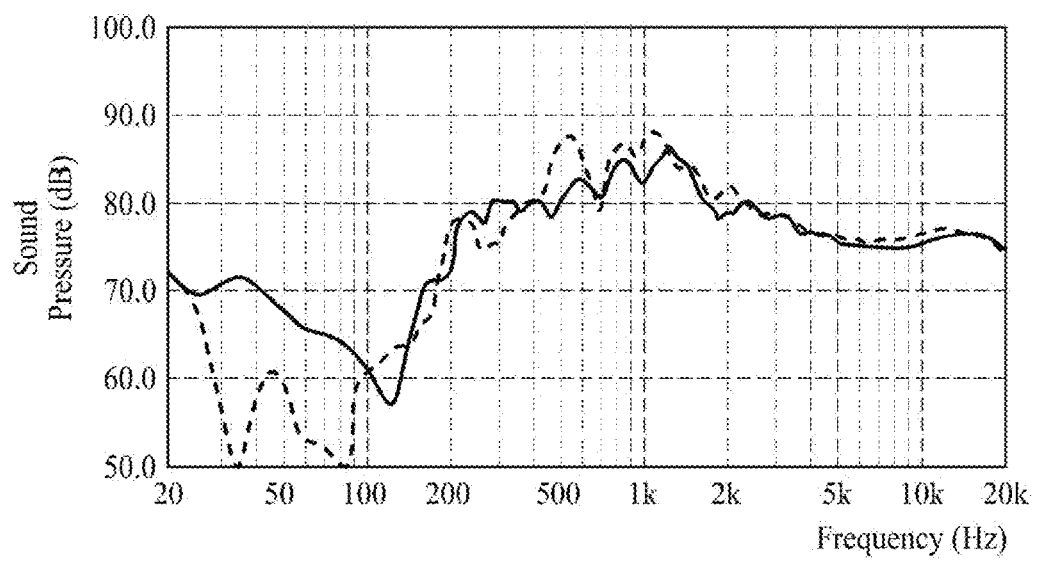
FIG. 16 is a diagram showing a sound output characteristic according to another example embodiment of a sound generation device and a partition in a display apparatus according to an example embodiment of the present disclosure.

FIG. 16 is a diagram showing a sound output characteristic according to another example embodiment of a sound generation device and a partition in a display apparatus according to an example embodiment of the present disclosure.

In FIG. 16, a dotted line shows a sound output characteristic of FIG. 14A, and a solid line shows a sound output characteristic of FIG. 14E. With reference to FIG. 16, it can be seen that a frequency characteristic corresponding to a whole sound band is better when a bent part and a protrusion portion are provided, as compared to when the bent part and the protrusion portion are not provided.

The sound output characteristic of each of FIGS. 15 and 16 may be measured by a sound analysis apparatus. The sound analysis apparatus may include a sound card for transmitting or receiving a sound to or from a control personal computer (PC), an amplifier for amplifying a signal generated from the sound card and transferring the amplified signal to sound generation devices 1600 and 1600', and a microphone for collecting a sound generated by the sound generation devices 1600 and 1600' in a display panel. The sound collected through the microphone may be input to the control PC through the sound card, and a control program may check the input sound to analyze the sound of the sound generation devices 1600 and 1600'.

FIGS. 17A to 17F illustrate another example embodiment of a sound generation device and a partition in a display apparatus according to an example embodiment of the present disclosure.

FIGS. 17A to 17F illustrate examples in which one or more sound generation devices or a pair of sound generation devices are provided in each of a first region and a second region of a display panel. In FIGS. 17A to 17F, a third partition 1700 may be provided in the sealed structure. For example, the third partition 1700 may be provided in the zigzag structure and the sealed structure. Alternatively, a bent part 712 may be provided in the sealed structure, and a portion of the bent part 712 between a first partition 1700' and a second partition 1700" may be provided in the unsealed structure. The portion of the bent part 712 between the first partition 1700' and the second partition 1700" may be provided in a rectilinear shape, a straight line shape, a curve shape, or a round shape, but the shape is not limited to these examples.

Figure 17A:
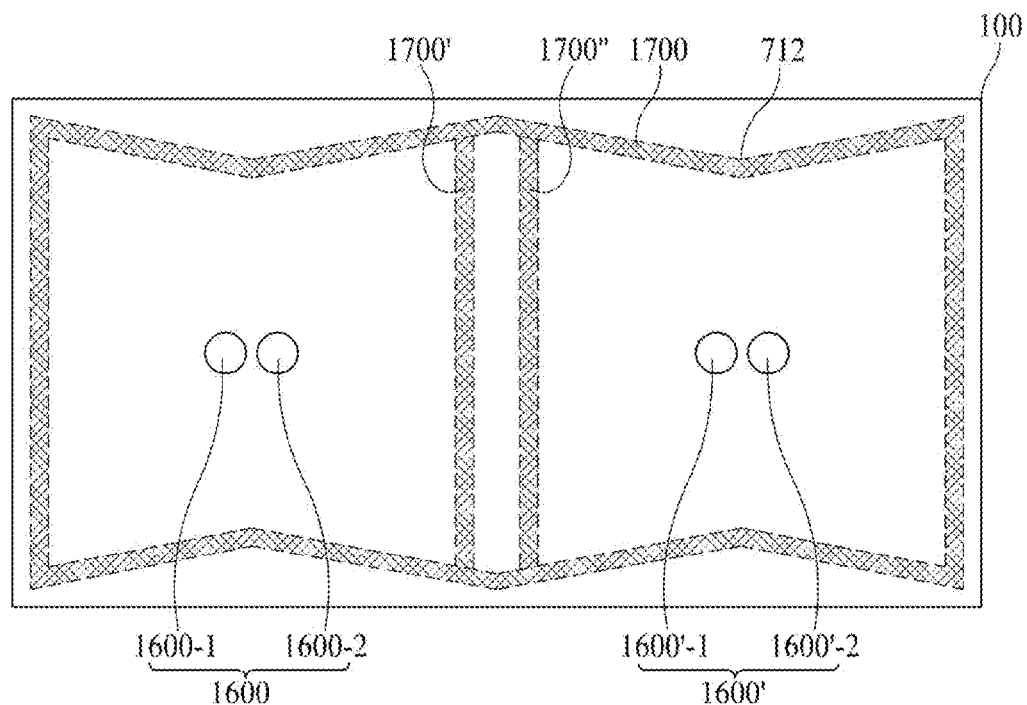
FIGS. 17A to 17F illustrate another example embodiment of a sound generation device and a partition in a display apparatus according to an example embodiment of the present disclosure.
Figure 17B:
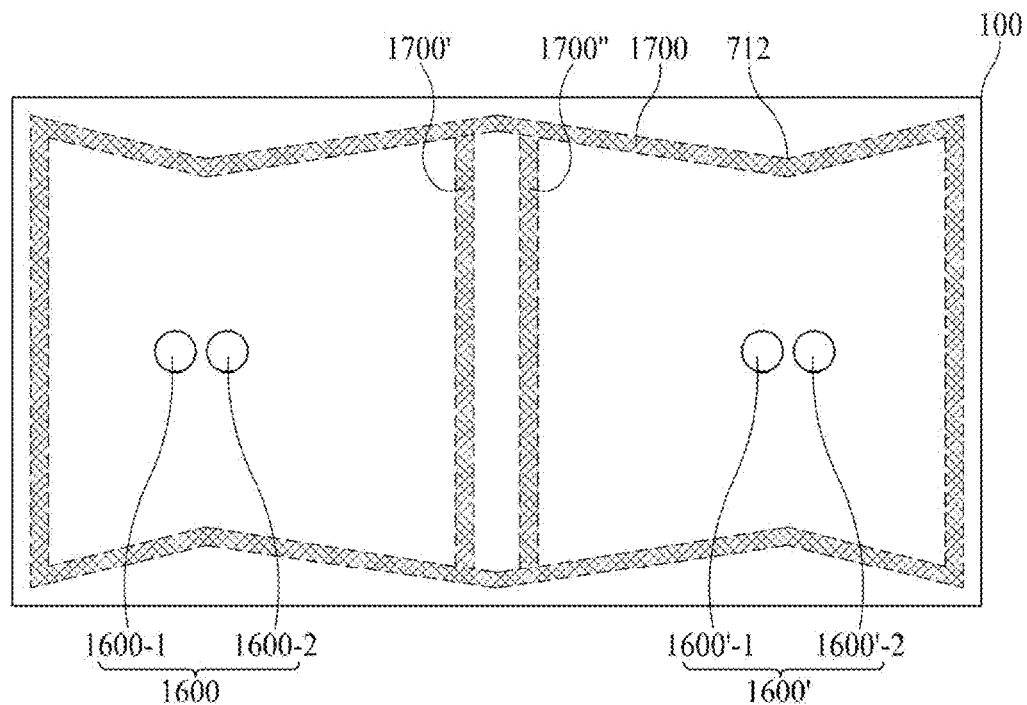
Figure 17C:
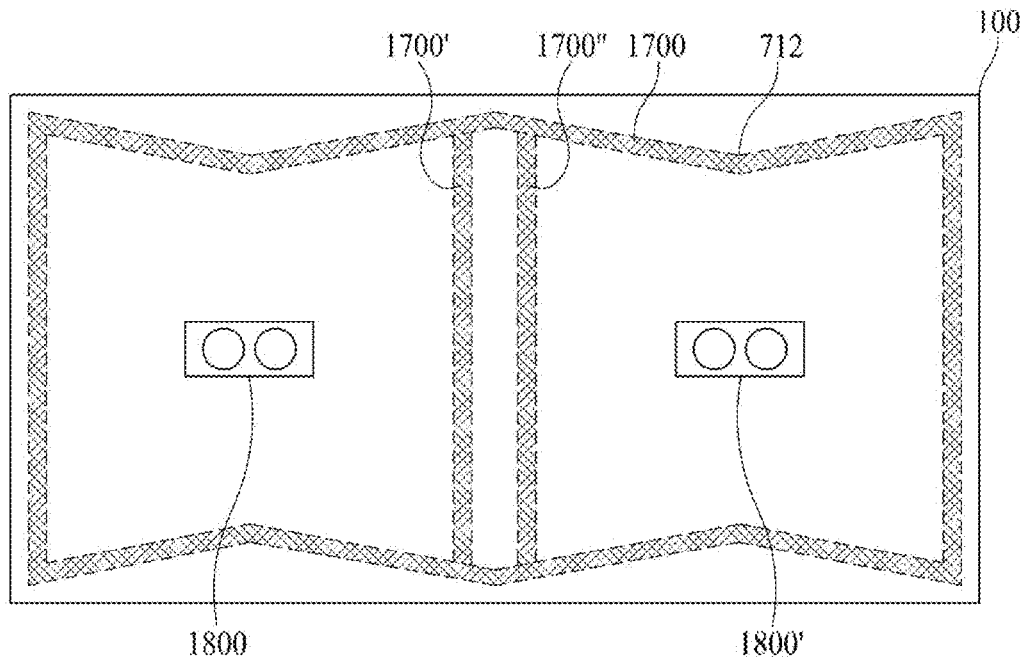
Figure 17D:
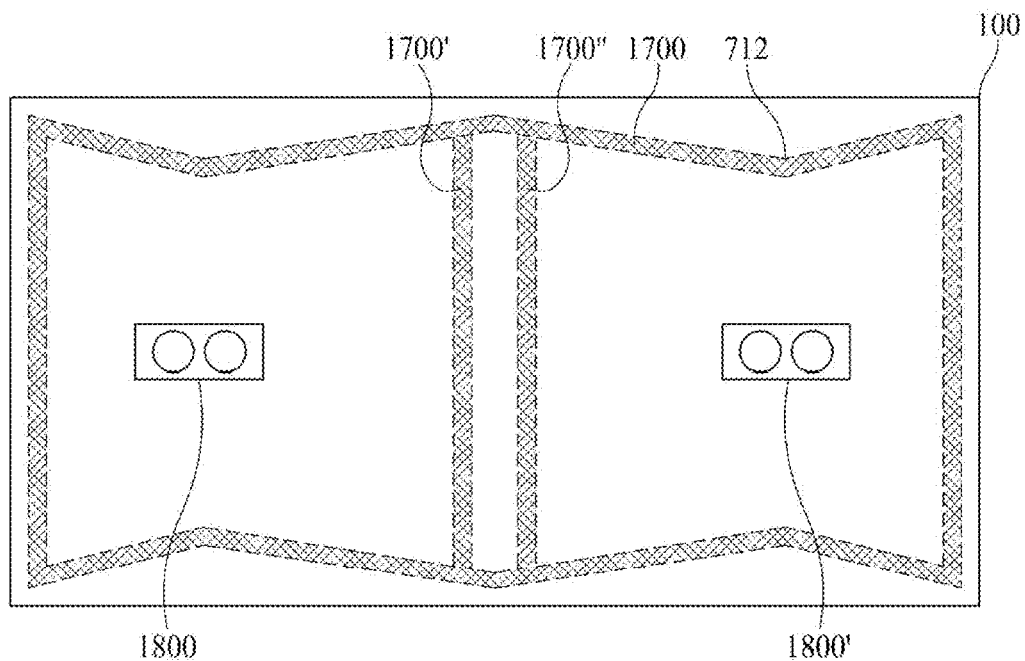
Figure 17E:
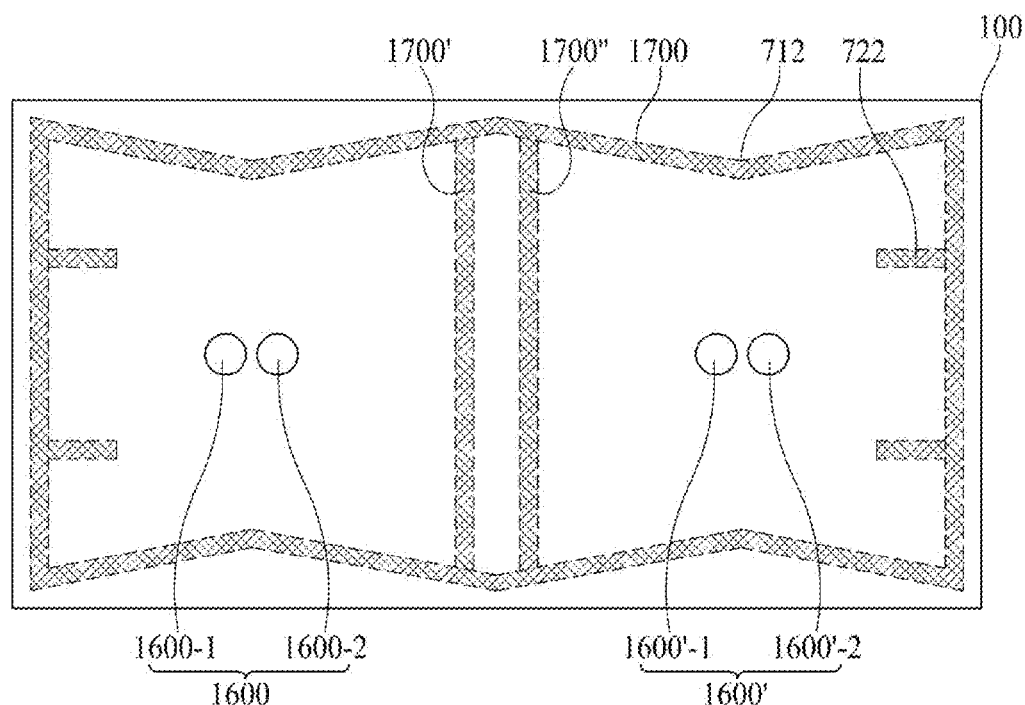
Figure 17F:
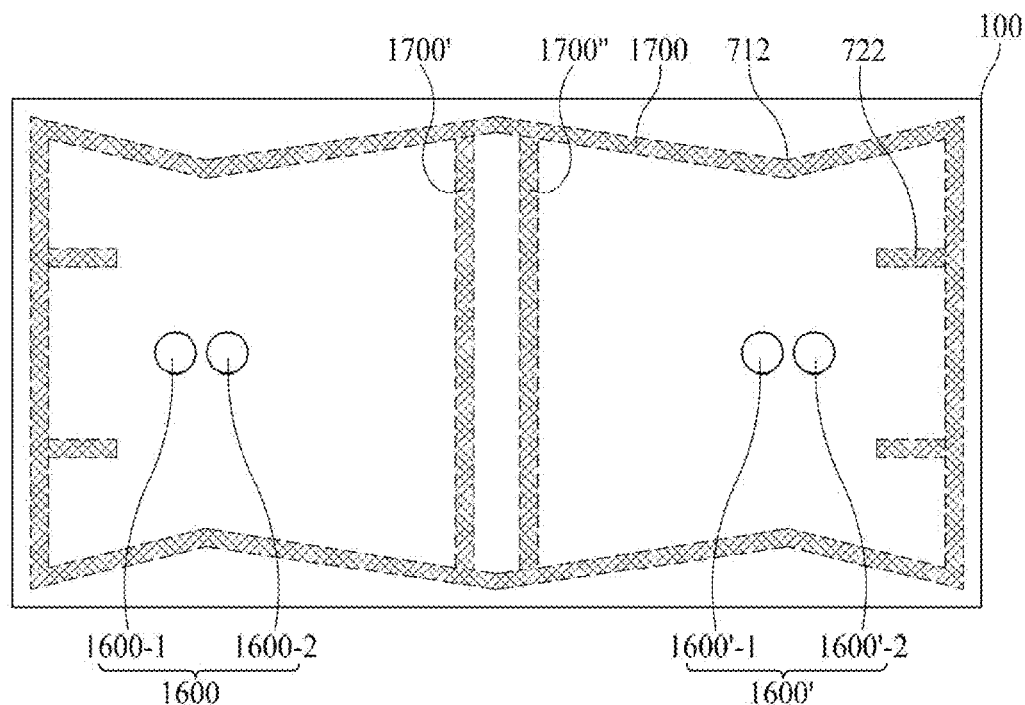

FIGS. 17A, 17C, and 17E illustrate examples in which a sound generation device is disposed in a center of a left region, which is a first region of a display panel 100, or a center of a right region, which is a second region. In FIGS. 17B, 17D, and 17F, examples in which the sound generation device is asymmetrically disposed are illustrated. For example, FIGS. 17B, 17D, and 17F illustrate examples in which the sound generation device is asymmetrically disposed. For example, the sound generation device may be disposed close to the left region, which is the first region of the display panel 100, or the right region, which is the second region.

With reference to FIGS. 17A and 17B, a first sound generation device 1600, including two sound generation devices 1600-1 and 1600-2, may be disposed in a first region, which is a left region of a display panel 100, and a second sound generation device 1600', including two sound generation devices 1600'-1 and 1600'-2, may be disposed in a second region, which is a right region of the display panel 100. A first partition 1700' and a second partition 1700" may be disposed between the first sound generation device 1600 and the second sound generation device 1600', and a third partition 1700 may be disposed in a periphery of the display panel 100. Alternatively, the first partition 1700' may be configured with two or more sub-partitions between the first sound generation device 1600 and the second sound generation device 1600'. A bent part 712 may be provided on one or more sides of the third partition 1700, and may be bent in a direction toward a center of the two sound generation devices 1600-1 and 1600-2 of the first sound generation device 1600, and a direction toward a center of the two sound generation devices 1600'-1 and 1600'-2 of the second sound generation device 1600'.

With reference to FIGS. 17C and 17D, a pair of first sound generation devices 1800 may be disposed in a first region, which is a left region of a display panel 100, and a pair of second sound generation devices 1800' may be disposed in a second region, which is a right region of the display panel 100. A first partition 1700' and a second partition 1700" may be disposed between the first sound generation device 1800 and the second sound generation device 1800', and a third partition 1700 may be disposed in a periphery of the display panel 100. Alternatively, the first partition 1700' may be configured with two or more sub-partitions between the first sound generation device 1800 and the second sound generation device 1800'. A bent part 712 may be provided on one or more sides of the third partition 1700. For example, the bent part 712 may bend in a direction toward a center of the pair of first sound generation devices 1800, and in a direction toward a center of the pair of second sound generation devices 1800'.

In FIGS. 17C and 17D, one or more protrusion portions may be further provided on a side vertical or perpendicular to a side on which the bent part 712 is provided, as in the examples of FIGS. 14G, 14H, 14I, and 14K. Alternatively, one or more protrusion portions may be further provided on a side of the third partition 1700. Also, as in FIGS. 14H and 14I, one or more protrusion portions may be further provided on each of sides vertical or perpendicular to the side on which the bent part 712 is provided. Alternatively, one or more protrusion portions may be further provided on a side of each of the first partition 1700', the second partition 1700", and the third partition 1700.

With reference to FIGS. 17E and 17F, a first sound generation device 1600, including two sound generation device 1600-1 and 1600-2, may be disposed in a first region, which is a left region of a display panel 100. A second sound generation device 1600', including two sound generation device 1600'-1 and 1600'-2, may be disposed in a second region, which is a right region of the display panel 100.

Moreover, because the first and second sound generation devices 1600 and 1600', each including two sound generation devices are provided, a signal or a current applied to a sound generation device may be divided into two signals or two currents, thereby reducing the occurrence of heat caused by a vibration of the sound generation device. Therefore, the occurrence of heat may be reduced, and thus, reliability may be enhanced. Also, when the first and second sound generation devices 1600 and 1600', each including two sound generation devices, are provided, a sound output characteristic may be doubly improved, thereby enhancing a sound pressure level. When the first and second sound generation devices 1600 and 1600', each including two sound generation devices, are provided in at least two of the first region, the second region, and the third region, two sub-sound generation devices, corresponding to each of the first to third regions, may output sounds having the same sound band, thereby increasing a sound pressure level.

One or more protrusion portions 722 may be further provided on each of sides vertical or perpendicular to the side on which the bent part 712 is provided. Alternatively, one or more protrusion portions may be further provided on a side of each of the first partition 1700', the second partition 1700", and the third partition 1700.

In FIGS. 17E and 17F, a second protrusion portion, described above with reference to the examples of FIGS. 14H and 14I, may be further provided. Each of a protrusion portion and a second protrusion portion may be provided as one or as a plurality on a second side vertical or perpendicular to a first side of four sides of the display panel 100. A protrusion portion may be disposed in the left region of the display panel 100, and the protrusion portion and a second protrusion portion may extend toward the first sound generation device 1600. A protrusion portion may be disposed in the right region of the display panel 100, and the protrusion portion and a second protrusion portion may extend toward the second sound generation device 1600'.

The first sound generation device 1600 and the second sound generation device 1600' may output different sounds having the middle-high-pitched sound band, and a stereo sound may be output through left-right sound separation. Alternatively, the first sound generation device 1600 may be provided in the first region, which is the left region, the second sound generation device 1600' may be provided in the second region, which is the right region, and a sound generation device may not be provided in a third region, which is a central region. Accordingly, a sound characteristic corresponding to the middle-high-pitched sound band in the left region and the right region may be further enhanced. In FIGS. 17A to 17F, an adhesive member for attaching a display panel on a supporting member may be provided in a periphery of each of the display panel and the supporting member as in FIG. 13.

FIGS. 18A to 18F illustrate another example embodiment of a sound generation device and a partition in a display apparatus according to an example embodiment of the present disclosure.

FIGS. 18A to 18F illustrate examples in which one or more sound generation devices or a pair of sound generation devices are provided in each of a first region and a second region of a display panel. In FIGS. 18A to 18F, a third partition 1700 may be provided in the unsealed structure. For example, the third partition 1700 may be provided in the zigzag structure and the unsealed structure. Alternatively, a bent part 712 may be provided in the unsealed structure, and a portion of the bent part 712 between a first partition 1700' and a second partition 1700" may be provided in the sealed structure. The portion of the bent part 712 between the first partition 1700' and the second partition 1700" may be provided in a rectilinear shape, a straight line shape, a curve shape, or a round shape, but the shape is not limited to these examples.

Figure 18A:
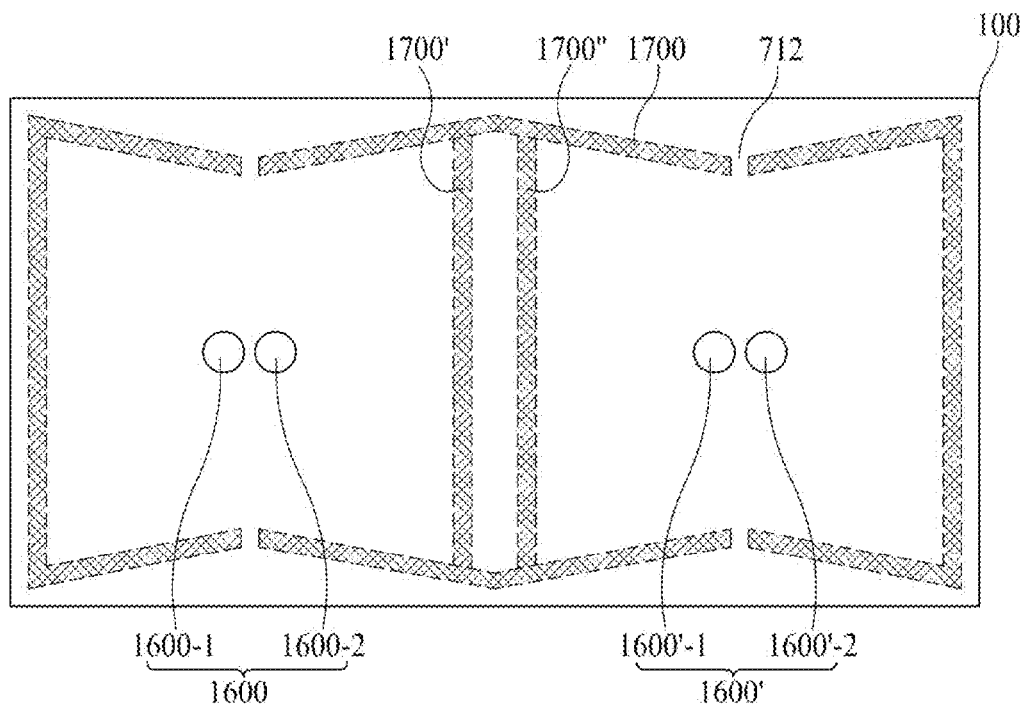
FIGS. 18A to 18F illustrate another example embodiment of a sound generation device and a partition in a display apparatus according to an example embodiment of the present disclosure.
Figure 18B:
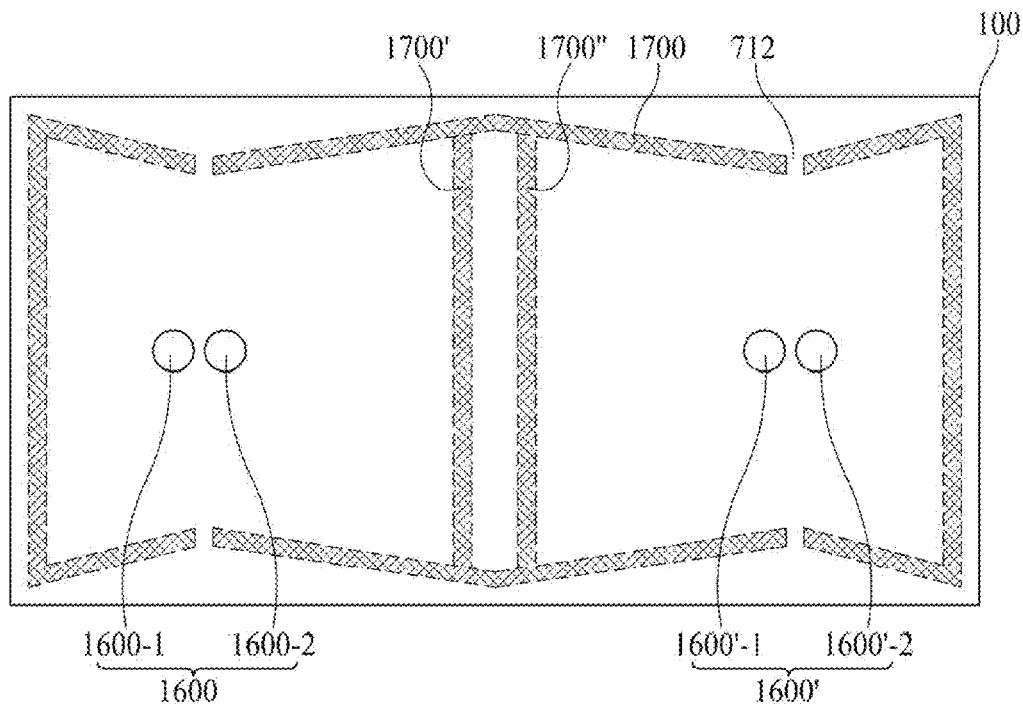
Figure 18C:
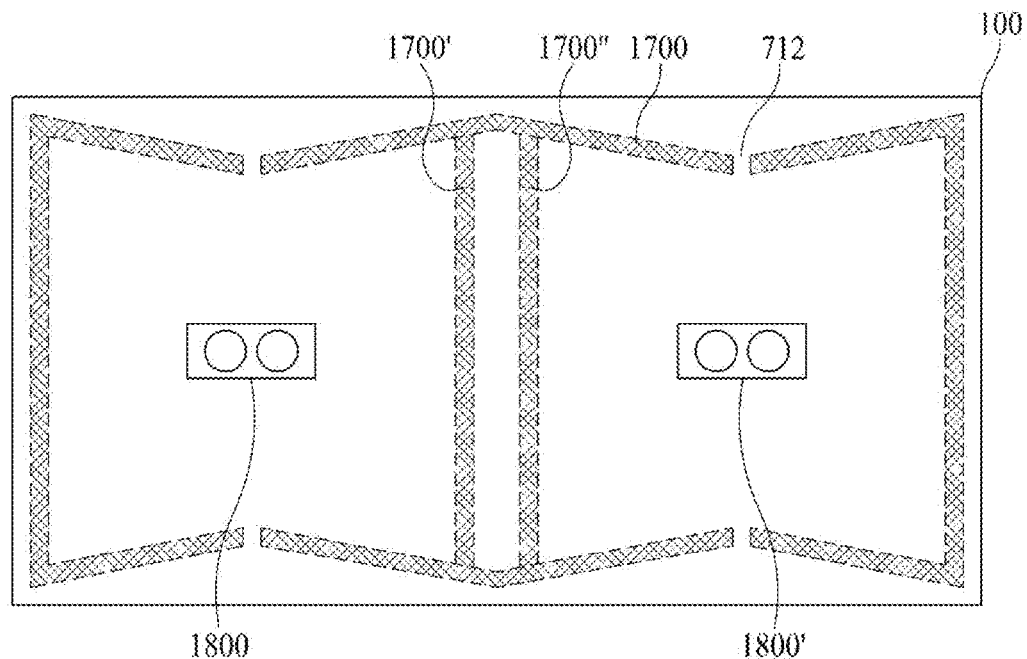
Figure 18D:
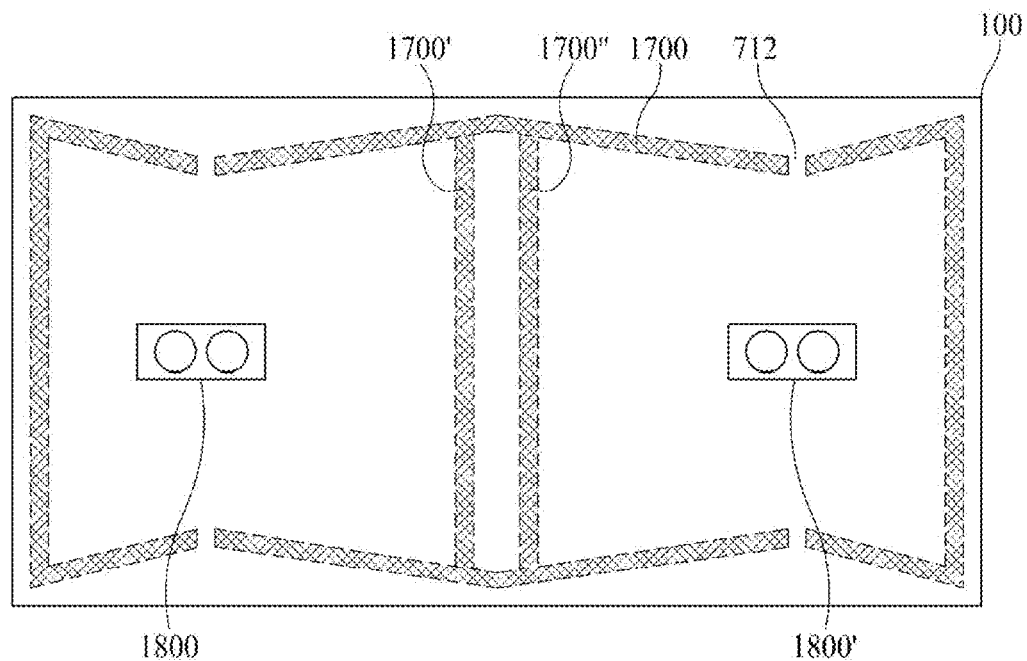
Figure 18E:
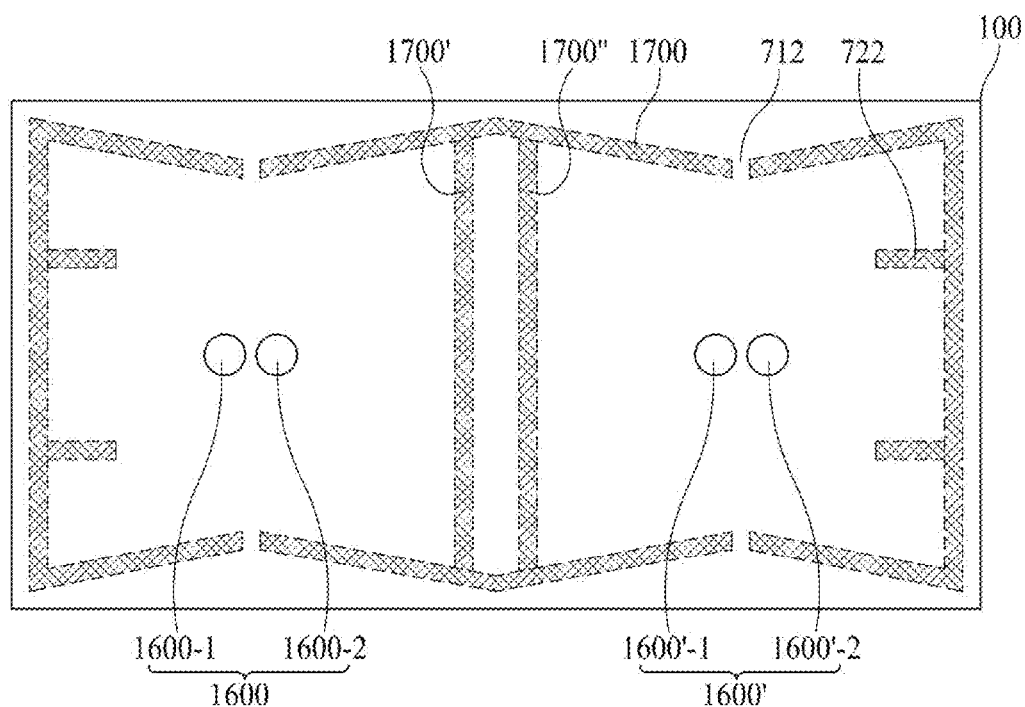
Figure 18F:
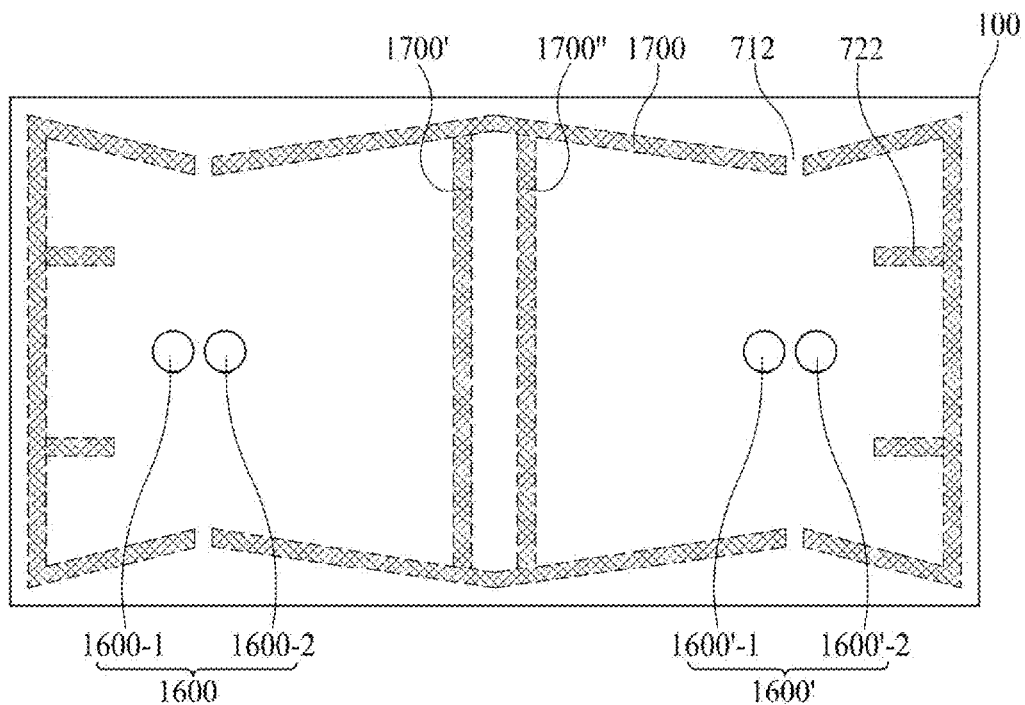

FIGS. 18A, 18C, and 18E illustrate examples in which a sound generation device is disposed in a center of a left region, which is a first region of a display panel 100, or a center of a right region, which is a second region. In FIGS. 18B, 18D, and 18F, examples in which the sound generation device is asymmetrically disposed are illustrated. For example, FIGS. 18B, 18D, and 18F illustrate examples in which the sound generation device is disposed close to the left region, which is the first region of the display panel 100, or the right region, which is the second region.

With reference to FIGS. 18A and 18B, a first sound generation device 1600, including two sound generation devices 1600-1 and 1600-2, may be disposed in a first region, which is a left region of a display panel 100, and a second sound generation device 1600', including two sound generation devices 1600'-1 and 1600'-2, may be disposed in a second region, which is a right region of the display panel 100. A first partition 1700' and a second partition 1700" may be disposed between the first sound generation device 1600 and the second sound generation device 1600', and a third partition 1700 may be disposed in a periphery of the display panel 100. Alternatively, the first partition 1700' may be configured with two or more sub-partitions between the first sound generation device 1600 and the second sound generation device 1600'. A bent part 712 may be provided on one or more sides of the third partition 1700, and may bend in a direction toward a center of the two sound generation devices 1600-1 and 1600-2 of the first sound generation device 1600, and in a direction toward a center of the two sound generation devices 1600'-1 and 1600'-2 of the second sound generation device 1600'.

With reference to FIGS. 18C and 18D, a pair of first sound generation devices 1800 may be disposed in a first region, which is a left region of a display panel 100, and a pair of second sound generation devices 1800' may be disposed in a second region, which is a right region of the display panel 100. A first partition 1700' and a second partition 1700" may be disposed between the first sound generation device 1800 and the second sound generation device 1800', and a third partition 1700 may be disposed in a periphery of the display panel 100. Alternatively, the first partition 1700' may be configured with two or more sub-partitions between the first sound generation device 1800 and the second sound generation device 1800'. A bent part 712 may be provided on one or more sides of the third partition 1700. For example, the bent part 712 may be bent in a direction toward a center of the pair of first sound generation devices 1800, and in a direction toward a center of the pair of second sound generation devices 1800'.

In FIGS. 18C and 18D, one or more protrusion portions may be further provided on a side vertical or perpendicular to a side on which the bent part 712 is provided, as illustrated in the examples of FIGS. 14G, 14H, 14I, and 14K. Alternatively, one or more protrusion portions may be further provided on a side of the third partition 1700. Also, as in the examples of FIGS. 14H and 14I, one or more protrusion portions may be further provided on each of sides vertical or perpendicular to the side on which the bent part 712 is provided. Alternatively, one or more protrusion portions may be further provided on a side of each of the first partition 1700', the second partition 1700", and the third partition 1700.

With reference to FIGS. 18E and 18F, a first sound generation device 1600, including two sound generation device 1600-1 and 1600-2, may be disposed in a first region, which is a left region of a display panel 100. A second sound generation device 1600', including two sound generation device 1600'-1 and 1600'-2, may be disposed in a second region, which is a right region of the display panel 100.

When the first and second sound generation devices 1600 and 1600', each including two sound generation devices, are provided, a signal or a current applied to a sound generation device may be divided into two signals or two currents, thereby reducing the occurrence of heat caused by a vibration of the sound generation device. Therefore, the occurrence of heat may be reduced, and thus, reliability may be enhanced. When the first and second sound generation devices 1600 and 1600', each including two sound generation devices, are provided, a sound output characteristic may be doubly improved, thereby enhancing a sound pressure level. When the first and second sound generation devices 1600 and 1600', each including two sound generation devices, are provided in at least two of the first region, the second region, and the third region, two sub-sound generation devices corresponding to each of the first to third regions may output sounds having the same sound band, thereby increasing a sound pressure level.

Moreover, one or more protrusion portions 722 may be further provided on each of sides vertical or perpendicular to the side on which the bent part 712 is provided. Alternatively, one or more protrusion portions may be further provided on a side of each of the first partition 1700', the second partition 1700", and the third partition 1700.

In the examples of FIGS. 18E and 18F, a second protrusion portion, described above with reference to the examples of FIGS. 14H and 14I, may be further provided. Each of a protrusion portion and a second protrusion portion may be provided as one or as a plurality on a second side vertical to a first side of four sides of the display panel 100. A protrusion portion may be disposed in the first (e.g., left) region of the display panel 100, and the protrusion portion and a second protrusion portion may extend toward the first sound generation device 1600. Also, a protrusion portion may be disposed in the second (e.g., right) region of the display panel 100, and the protrusion portion and a second protrusion portion may extend toward the second sound generation device 1600'.

The first sound generation device 1600 and the second sound generation device 1600' may output different sounds having the middle-high-pitched sound band, and a stereo sound may be output through left-right sound separation. Alternatively, the first sound generation device 1600 may be provided in the first region, which is the left region, the second sound generation device 1600' may be provided in the second region, which is the right region, and a sound generation device may not be provided in a third region, which is a center region. Accordingly, a sound characteristic corresponding to the middle-high-pitched sound band in the left region and the right region may be further enhanced.

In FIGS. 18A to 18F, an adhesive member for attaching a display panel on a supporting member may be provided in a periphery of each of the display panel and the supporting member, as shown in the example of FIG. 13. Descriptions given above with reference to FIGS. 8 to 12 may be similarly applied to embodiments of the sound generation device and the partition described with reference to FIGS. 13, 14, 17, and 18.

A display apparatus according to an embodiment of the present disclosure will be described below.

According to an embodiment of the present disclosure, a display apparatus may include: a display panel configured to display an image, at least one supporting member on a rear surface of the display panel, the at least one supporting member defining a groove, at least one sound generation device adjacent to the display panel, and a wiring, accommodated into the groove, configured to transfer a signal to the at least one sound generation device.

For example, in the display apparatus according to an embodiment of the present disclosure, the at least one supporting member may include: a first supporting member, and a second supporting member closer to the display panel than the first supporting member, and the groove may be in the second supporting member. For example, in the display apparatus according to an embodiment of the present disclosure, the first supporting member may include a hole, and the wiring extends to a rear surface of the first supporting member through the hole.

For example, in the display apparatus according to an embodiment of the present disclosure, a rear cover may be on the rear surface of the first supporting member, and the wiring extending to the rear surface of the first supporting member may be covered by the rear cover. For example, in the display apparatus according to an embodiment of the present disclosure, a rigid bar and a rear cover may be on the rear surface of the first supporting member, and the rigid bar and the wiring extending to the rear surface of the first supporting member may be covered by the rear cover.

For example, in the display apparatus according to an embodiment of the present disclosure, a driving circuit unit configured to transfer the signal to the wiring may be on the rear surface of the first supporting member, and the wiring may be electrically connected to the driving circuit unit. For example, in the display apparatus according to an embodiment of the present disclosure, a rear cover may be on the rear surface of the first supporting member, and the driving circuit unit may be covered by the rear cover.

For example, in the display apparatus according to an embodiment of the present disclosure, the at least one sound generation device may include two sound generation devices, and the groove may be between the two sound generation devices. For example, in the display apparatus according to an embodiment of the present disclosure, the at least one sound generation device may be configured to vibrate the display panel to generate sound having a middle-high-pitched sound band, and sound having a low-pitched sound band. For example, the display apparatus according to an embodiment of the present disclosure may further include a partition in a periphery of the display panel.

According to an embodiment of the present disclosure, a display apparatus may include: a display panel configured to display an image, the display panel including: a first region, a second region, and a third region, at least one supporting member on a rear surface of the display panel, at least one sound generation device configured to vibrate the display panel to generate sound, the at least one sound generation device being in at least one of the first region, the second region, and the third region, and a wiring between the display panel and the at least one supporting member, the wiring being configured to transfer a signal to the at least one sound generation device.

For example, in the display apparatus according to an embodiment of the present disclosure, the at least one supporting member includes: a first supporting member, and a second supporting member closer to the display panel than the first supporting member, and the second supporting member may include a groove accommodating the wiring. For example, in the display apparatus according to an embodiment of the present disclosure, the first supporting member may include a hole, and the wiring extends to a rear surface of the first supporting member through the hole. For example, in the display apparatus according to an embodiment of the present disclosure, a rear cover may be on the rear surface of the first supporting member, and the wiring extending to the rear surface of the first supporting member may be covered by the rear cover.

For example, in the display apparatus according to an embodiment of the present disclosure, a driving circuit unit configured to transfer the signal to the wiring may be on a rear surface of the supporting member, and the wiring may be connected to the driving circuit unit. For example, in the display apparatus according to an embodiment of the present disclosure, a rear cover may be on the rear surface of the first supporting member, and the wiring connected to the driving circuit unit may be covered by the rear cover. For example, in the display apparatus according to an embodiment of the present disclosure, the first supporting member further may include a rigid bar, and the wiring may be under the rigid bar.

For example, in the display apparatus according to an embodiment of the present disclosure, the first region may be a left region of the display panel, the second region may be a right region of the display panel, and the third region may be a center region of the display panel. For example, in the display apparatus according to an embodiment of the present disclosure, at least one sound generation device or a pair of sound generation devices may be in each of the first region and the second region. For example, in the display apparatus according to an embodiment of the present disclosure, sound having a middle-high-pitched sound band may be generated in each of the first region and the second region, and sound having a low-pitched sound band may be generated in the third region.

For example, the display apparatus according to an embodiment of the present disclosure may further include at least one first partition between the first region and the second region, and at least one second partition between the second region and the third region. For example, the display apparatus according to an embodiment of the present disclosure may further include a third partition in a periphery of the display panel, the third partition including a bent part that may be bent in a direction toward the at least one sound generation device. For example, the display apparatus according to an embodiment of the present disclosure may further include a third partition in a periphery of the display panel, the third partition including a bent part disposed on at least one first side of four sides of the third partition and bent in a direction toward the at least one sound generation devices, and at least one protrusion portion on at least one of second sides vertical to the first sides. For example, in the display apparatus according to an embodiment of the present disclosure, two sound generation devices or a pair of sound generation devices may be in each of at least two of the first region, the second region, and the third region.

According to an embodiment of the present disclosure, a display apparatus may include: a display panel configured to display an image, a first supporting member and a second supporting member on a rear surface of the display panel, at least one sound generation device configured to vibrate the display panel to generate sound, the at least one sound generation device being adjacent to the display panel, a rear cover on a rear surface of the first supporting member, and a wiring configured to transfer a signal to the at least one sound generation device. The wiring may extend to a rear surface of the first supporting member and may be covered by the rear cover.

For example, in the display apparatus according to an embodiment of the present disclosure, the second supporting member may include a groove accommodating the wiring, and the first supporting member may include a hole configured to enable the wiring to extend to the rear surface of the first supporting member. For example, in the display apparatus according to an embodiment of the present disclosure, the wiring extends to the rear surface of the first supporting member through the hole.

For example, in the display apparatus according to an embodiment of the present disclosure, a driving circuit unit configured to transfer the signal to the wiring may be on the rear surface of the first supporting member, and the wiring may be connected to the driving circuit unit. For example, in the display apparatus according to an embodiment of the present disclosure, the driving circuit unit may be covered by the rear cover. For example, in the display apparatus according to an embodiment of the present disclosure, a rigid bar may be on the rear surface of the first supporting member, and the rigid bar may be covered by the rear cover.

As described above, when the display apparatus according to an embodiment of the present disclosure includes the sound generation device which vibrates the display panel to generate a sound, the sound of the display apparatus may be output to a region in front of the display panel. Accordingly, an immersion experience of a viewer, who is watching an image displayed by the display apparatus, may be enhanced.

Moreover, when the display apparatus according to an embodiment of the present disclosure includes the sound generation device that vibrates the display panel to generate a sound, a speaker may not be provided. Thus, a degree of freedom in design and element disposition of a set apparatus may be enhanced.

Moreover, in the display apparatus according to an embodiment of the present disclosure, when the heat dissipation member is provided in the display panel, a low-pitched sound characteristic may be enhanced, and the image quality of the display panel may be reduced or prevented from being degraded by heat that may occur due to driving of the sound generation device.

Moreover, in the display apparatus according to an embodiment of the present disclosure, when the wiring for supplying a signal to the sound generation device is accommodated into the groove of the supporting member, the wiring may not be exposed at the rear surface of the supporting member. Accordingly, a display apparatus having a good aesthetic design may be provided.

Moreover, in the display apparatus according to an embodiment of the present disclosure, when the wiring for supplying a signal to the sound generation device is accommodated into the groove of the supporting member and the wiring extending to the rear surface of the supporting member is covered by the rear cover, the wiring may not be externally seen at the rear surface of the supporting member. Accordingly, a display apparatus having a clean-looking design may be provided.

Moreover, in the display apparatus according to an embodiment of the present disclosure, when the wiring for applying a signal to the sound generation device is accommodated into the groove of the second supporting member and the wiring extending to the rear surface of the first supporting member is covered by the rear cover, the wiring may not be exposed at the rear surface of the first supporting member, thereby solving a problem caused by a separate structure for covering a wiring being provided through an additional process.

Moreover, in the display apparatus according to an embodiment of the present disclosure, when the wiring for applying a signal to the sound generation device is accommodated into the groove of the second supporting member and the wiring extending to the rear surface of the first supporting member is covered by the rear cover, the wiring may not be exposed at the rear surface of the first supporting member, thereby solving a problem in which, due to the a width of the rigid bar or a width of the sound generation device, it may be difficult to achieve a sense of beauty for the display apparatus.

Moreover, in the display apparatus according to an embodiment of the present disclosure, when the partition is provided between one or more sound generation devices disposed on the display panel, the partition may separate a sound. Thus, a stereo sound may be realized. Accordingly, a display apparatus having an enhanced sound output characteristic may be provided.

Moreover, when the display apparatus according to an embodiment of the present disclosure includes the partition including the bent part or the protrusion portion, sound quality may be prevented from being reduced by the standing wave or the reflected wave that may occur in the display panel. Accordingly, a display apparatus having an enhanced sound output characteristic may be provided.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
a display panel configured to display an image;
at least one supporting member on a rear surface of the display panel;
at least one sound generation device on the rear surface of the display panel, the at least one sound generation device being configured to vibrate the display panel; and
a wiring configured to transfer a signal to the at least one sound generation device,
wherein the at least one supporting member includes a groove and a hole overlapping with the groove, and
wherein the wiring is accommodated into the groove through the hole.

2. The display apparatus of claim 1, wherein:
the at least one sound generation device comprises a first sound generation device and a second generation device; and
the groove is between the first sound generation device and the second generation device.

3. The display apparatus of claim 2, wherein:
each of the first sound generation device and the second generation device comprises a terminal, and
the groove is between the terminal of the first sound generation device and the terminal of the second generation device.

4. The display apparatus of claim 1, wherein the at least one sound generation device is a circular shape or an oval shape.

5. The display apparatus of claim 1, wherein:
the at least one sound generation device comprises a bobbin configured to vibrate the display panel, and
the bobbin is a circular shape or an oval shape.

6. The display apparatus of claim 1, wherein:
the at least one supporting member comprises:
a first supporting member; and
a second supporting member closer to the display panel than the first supporting member, and
the groove is in the second supporting member.

7. The display apparatus of claim 6, wherein:
the hole is in the first supporting member, and
the wiring extends to a rear surface of the first supporting member through the hole.

8. The display apparatus of claim 7, wherein:
a rear cover is on the rear surface of the first supporting member; and
the wiring extending to the rear surface of the first supporting member is covered by the rear cover.

9. The display apparatus of claim 7, wherein:
a rigid bar and a rear cover are on the rear surface of the first supporting member; and
the rigid bar and the wiring extending to the rear surface of the first supporting member are covered by the rear cover.

10. The display apparatus of claim 7, wherein:
a driving circuit portion configured to transfer the signal to the wiring is on a rear surface of the first supporting member; and
the wiring is electrically connected to the driving circuit portion.

11. The display apparatus of claim 10, wherein:
a rear cover is on the rear surface of the first supporting member; and
the driving circuit portion is covered by the rear cover.

12. The display apparatus of claim 1, wherein the at least one sound generation device is configured to vibrate the display panel to generate:
sound having a middle-high-pitched sound band; and
sound having a low-pitched sound band.

13. The display apparatus of claim 1, further comprising a partition on the rear surface of the display panel and in a periphery of the display panel.

14. The display apparatus of claim 13, wherein the wiring pass through between the at least one supporting member and the partition.

15. The display apparatus of claim 6, further comprising a partition on the rear surface of the display panel and in a periphery of the display panel, and
wherein the wiring pass through between the first supporting member and the partition.

16. A display apparatus, comprising:
a display panel configured to display an image, the display panel comprising:
a first region;
a second region; and
a third region;
at least one supporting member on a rear surface of the display panel;
at least one sound generation device configured to vibrate the display panel to generate sound, the at least one sound generation device being in at least one or more of the first region, the second region, and the third region; and
a wiring between the display panel and the at least one supporting member, the wiring being configured to transfer a signal to the at least one sound generation device,
wherein the at least one supporting member includes a groove and a hole overlapping with the groove, and
wherein the wiring is accommodated into the groove through the hole.

17. The display apparatus of claim 16, wherein:
the at least one sound generation device comprises a first sound generation device and a second generation device; and the groove is between the first sound generation device and the second generation device.

18. The display apparatus of claim 17, wherein:
each of the first sound generation device and the second generation device comprises a terminal, and
the groove is between the terminal of the first sound generation device and the terminal of the second generation device.

19. The display apparatus of claim 16, wherein the at least one sound generation device is a circular shape or an oval shape.

20. The display apparatus of claim 16, wherein:
the at least one sound generation device comprises a bobbin configured to vibrate the display panel, and
the bobbin is a circular shape or an oval shape.

21. The display apparatus of claim 16, wherein:
the at least one supporting member comprises:
a first supporting member; and
a second supporting member closer to the display panel than the first supporting member; and
the groove is in the second supporting member.

22. The display apparatus of claim 21, wherein:
the hole is in the first supporting member, and
the wiring extends to a rear surface of the first supporting member through the hole.

23. The display apparatus of claim 22, wherein:
a rear cover is on the rear surface of the first supporting member; and
the wiring extending to the rear surface of the first supporting member is covered by the rear cover.

24. The display apparatus of claim 21, wherein:
a driving circuit portion configured to transfer the signal to the wiring is on a rear surface of the first supporting member; and
the wiring is connected to the driving circuit portion.

25. The display apparatus of claim 24, wherein:
a rear cover is on the rear surface of the first supporting member; and
the wiring connected to the driving circuit portion is covered by the rear cover.

26. The display apparatus of claim 21, wherein:
a rigid bar is on a rear surface the first supporting member; and
the wiring is under the rigid bar.

27. The display apparatus of claim 16, wherein:
the first region is a left region of the display panel;
the second region is a right region of the display panel; and
the third region is a center region of the display panel.

28. The display apparatus of claim 16, wherein:
sound having a middle-high-pitched sound band is generated in each of the first region and the second region; and
sound having a low-pitched sound band is generated in the third region.

29. The display apparatus of claim 16, further comprising:
at least one first partition on the rear surface of the display panel between the first region and the second region; and
at least one second partition between the second region and the third region.

30. The display apparatus of claim 29, further comprising a third partition in a periphery of the display panel, the third partition comprising a bent part that is bent in a direction toward the at least one sound generation device.

31. The display apparatus of claim 29, further comprising:
a third partition in a periphery of the display panel, the third partition comprising a bent part disposed on at least one first side of four sides of the third partition and bent in a direction toward the at least one sound generation devices and at least one protrusion portion on at least one of second sides vertical to the first sides.

32. The display apparatus of claim 16, wherein two sound generation devices or a pair of sound generation devices is in each of at least two of the first region, the second region, and the third region.

\* \* \* \* \*